US011930956B2

(12) United States Patent
Groll et al.

(10) Patent No.: US 11,930,956 B2
(45) Date of Patent: Mar. 19, 2024

(54) COOKWARE HAVING A GRAPHITE CORE

(71) Applicant: All-Clad Metalcrafters, L.L.C., Canonsburg, PA (US)

(72) Inventors: William A. Groll, McMurray, PA (US); Jean Murray Stewart, Moon Township, PA (US)

(73) Assignee: All-Clad Metalcrafters, L.L.C., Canonsburg, PA (US)

( * ) Notice: Subject to any disclaimer, the term of this patent is extended or adjusted under 35 U.S.C. 154(b) by 482 days.

(21) Appl. No.: 16/714,120

(22) Filed: Dec. 13, 2019

(65) Prior Publication Data

US 2021/0177195 A1 Jun. 17, 2021

(51) Int. Cl.
*A47J 36/04* (2006.01)
*B32B 9/00* (2006.01)
(Continued)

(52) U.S. Cl.
CPC .............. *A47J 36/04* (2013.01); *B32B 9/007* (2013.01); *B32B 15/20* (2013.01); *B32B 9/041* (2013.01)

(58) Field of Classification Search
CPC ........... Y10T 428/12; Y10T 428/12347; Y10T 428/12382; Y10T 428/12444; Y10T 428/12493; Y10T 428/12535; Y10T 428/12542; Y10T 428/12549; Y10T 428/12625; Y10T 428/12632; Y10T 428/12736; Y10T 428/1275; Y10T 428/12757; Y10T 428/12764; Y10T 428/12771; Y10T 428/12861; Y10T 428/12951; Y10T 428/12958; Y10T 428/12965; Y10T 428/12972; Y10T 428/12979; Y10T 428/24174; Y10T 428/24182; Y10T 428/24273; Y10T 428/24322; Y10T 428/24331; Y10T 428/24339; Y10T 428/24347; Y10T 428/24479; Y10T 428/24562; Y10T 428/24612; Y10T 428/24942; Y10T 428/2495; Y10T 428/24967; Y10T 428/26;
(Continued)

(56) References Cited

U.S. PATENT DOCUMENTS 4,167,606 A 9/1979 Ulam
4,246,045 A 1/1981 Ulam
(Continued)

FOREIGN PATENT DOCUMENTS

CN 109808282 A 5/2019

*Primary Examiner* — Maria V Ewald
*Assistant Examiner* — Ethan A. Utt
(74) *Attorney, Agent, or Firm* — The Webb Law Firm

(57) ABSTRACT

Provided is cookware made from a bonded multi-layer blank assembly. The cookware has a first metal layer, a second metal layer having a cavity with a plurality of spaced-apart posts protruding from a bottom surface of the cavity, and a perforated graphite layer having a thickness of at least 0.010 in. (0.254 mm) and a plurality of spaced-apart holes formed therethrough. The perforated graphite layer is positioned within the cavity of the second metal layer such that the plurality of spaced-apart posts extend through the plurality of spaced-apart holes. The second metal layer is metallurgically bonded to the first metal layer at least via the plurality of spaced-apart posts. A method of making the bonded multi-layer composite cookware is also disclosed.

16 Claims, 8 Drawing Sheets

(51) Int. Cl.
B32B 9/04 (2006.01)
B32B 15/20 (2006.01)

(58) Field of Classification Search
CPC ............... Y10T 428/266; Y10T 428/30; Y10T 428/31678; Y10T 428/24802; Y10T 428/2481; Y10T 428/24826; Y10T 428/24917; Y10S 220/912; B32B 1/00; B32B 1/02; B32B 3/00; B32B 3/24; B32B 3/26; B32B 3/263; B32B 3/266; B32B 3/30; B32B 7/00; B32B 7/04; B32B 9/00; B32B 9/005; B32B 9/007; B32B 9/04; B32B 9/041; B32B 15/00; B32B 15/04; B32B 15/043; B32B 15/14; B32B 15/18; B32B 15/20; B32B 2255/06; B32B 2262/10; B32B 2262/106; B32B 2311/24; B32B 2311/30; B32B 2313/04; B32B 7/05; A47J 27/00; A47J 27/002; A47J 27/02; A47J 27/022; A47J 36/00; A47J 36/02; A47J 36/04; A47J 36/025; A47J 36/321; A47J 37/00; A47J 37/10
USPC ....... 428/544, 594, 599, 608, 615, 621–623, 428/634, 635, 650, 652–655, 668, 428/681–685, 64.1, 66.6, 119, 120, 131, 428/137–140, 156, 166, 172, 212, 213, 428/215, 220, 332, 337, 408, 457, 195.1, 428/196, 198, 209; 99/324; 220/573.1, 220/573.2, 62.11, 62.15, 62.17, 62.19, 220/912

See application file for complete search history.

(56) References Cited

U.S. PATENT DOCUMENTS

| | | |
|---|---|---|
| 6,267,830 B1 | 7/2001 | Groll |
| 6,427,904 B1* | 8/2002 | Groll .................. B23K 20/2333 228/208 |
| 8,133,596 B2 | 3/2012 | Groll |
| 9,078,539 B2 | 7/2015 | Groll et al. |
| 9,585,514 B2 | 3/2017 | Groll et al. |
| 2003/0160053 A1 | 8/2003 | Kim |
| 2005/0242086 A1* | 11/2005 | Imura .................. A47J 36/321 219/627 |
| 2011/0041708 A1* | 2/2011 | Groll ..................... A47J 27/002 164/112 |
| 2011/0123826 A1* | 5/2011 | Groll ..................... A47J 36/02 428/653 |
| 2015/0001226 A1* | 1/2015 | Groll ..................... A47J 37/10 220/573.1 |
| 2015/0313405 A1* | 11/2015 | Groll ..................... B32B 15/012 220/573.1 |
| 2017/0157895 A1* | 6/2017 | Groll ..................... B32B 15/18 |
| 2018/0290432 A1 | 10/2018 | Groll et al. |
| 2020/0198296 A1 | 6/2020 | Groll et al. |

* cited by examiner

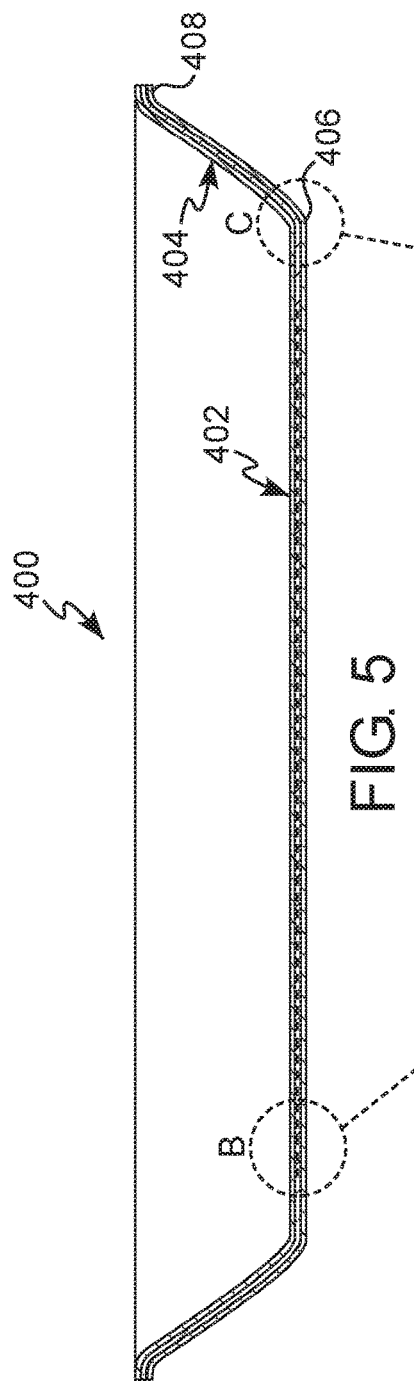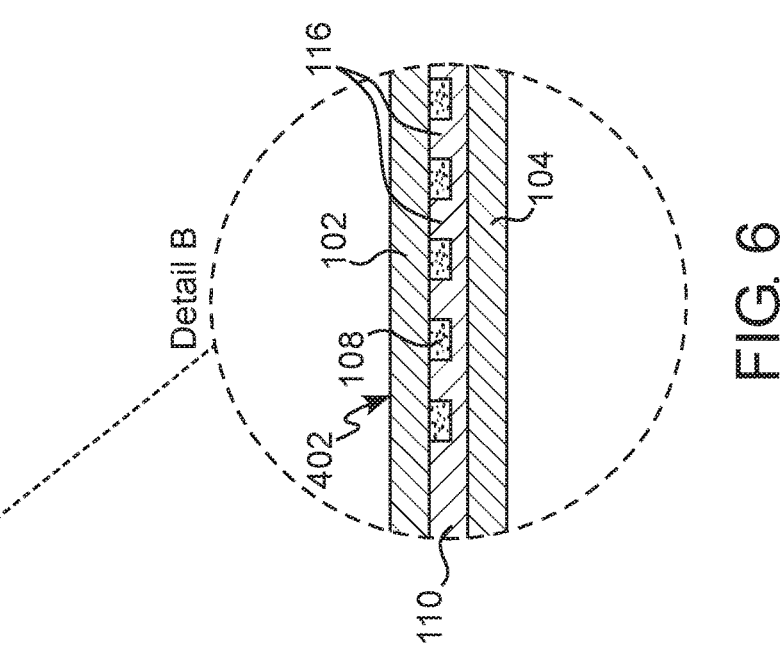

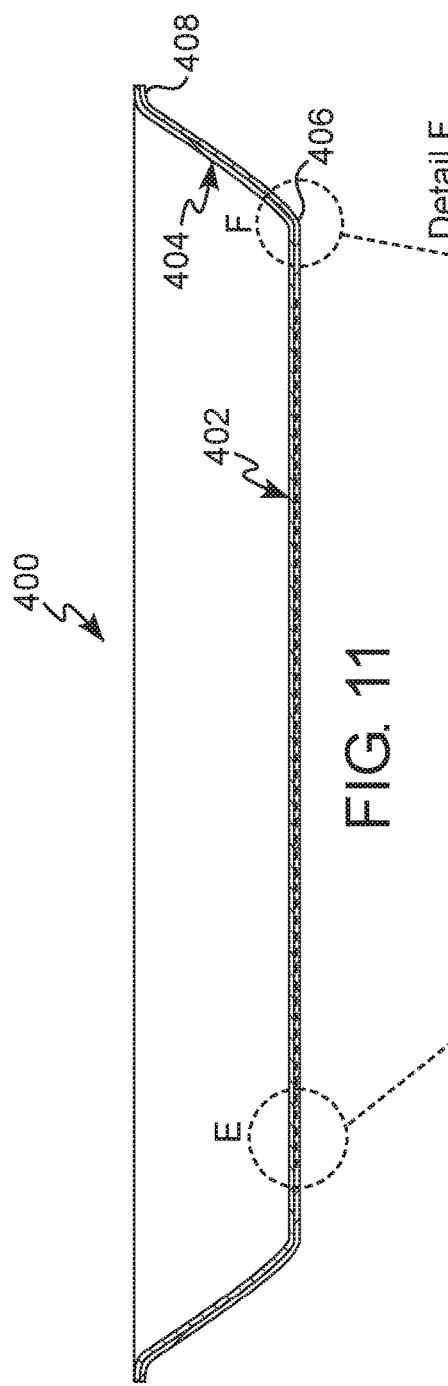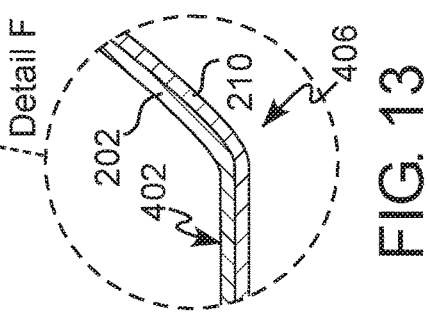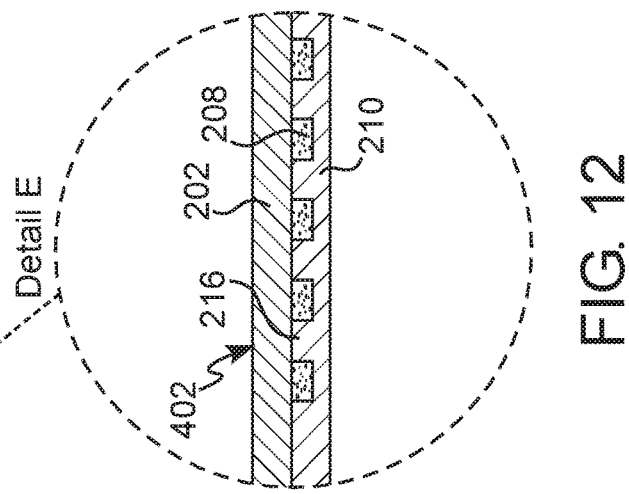

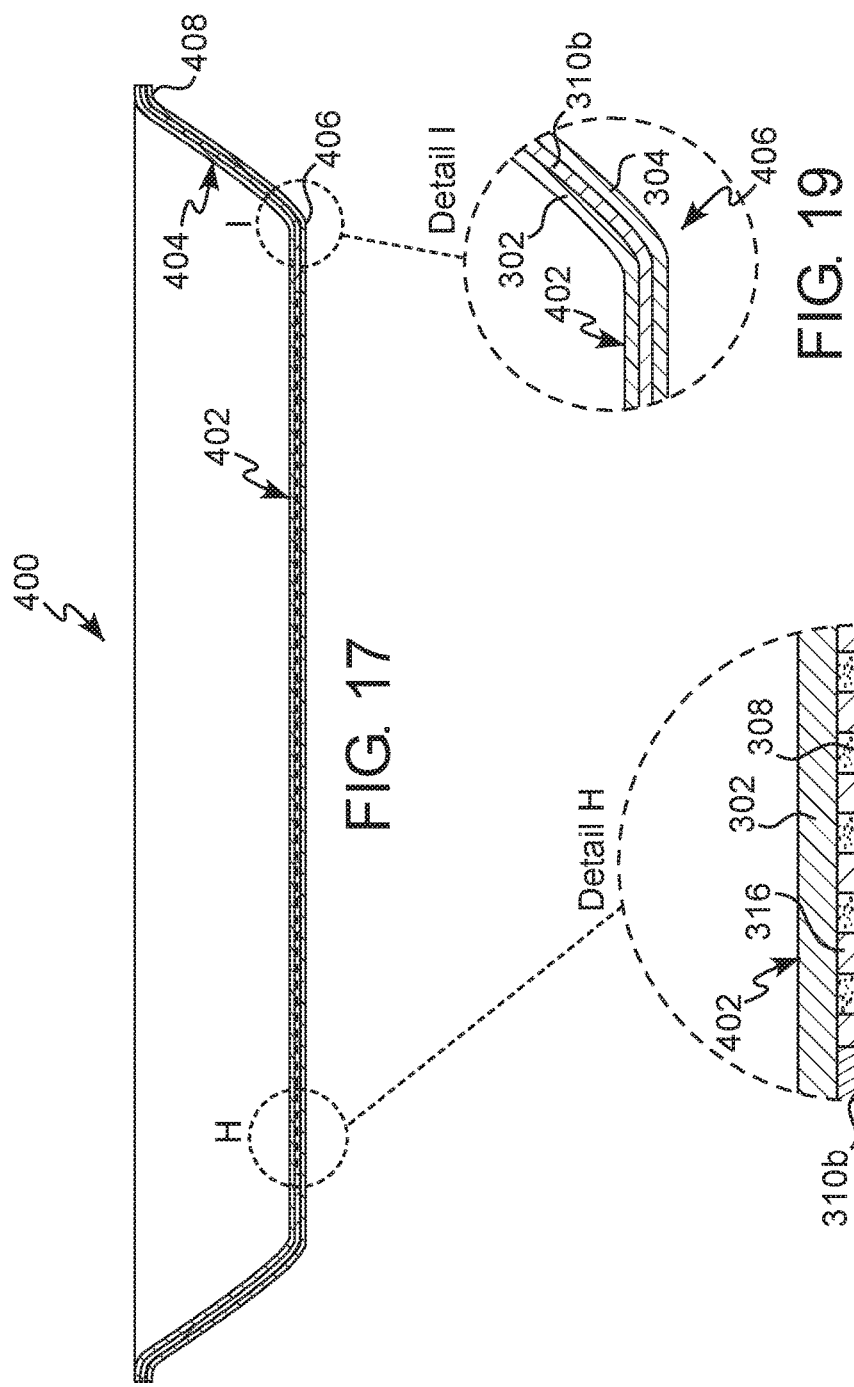

COOKWARE HAVING A GRAPHITE CORE

BACKGROUND OF THE DISCLOSURE

Field of the Disclosure

The present disclosure relates generally to multi-ply, bonded cookware, and in particular to multi-ply, bonded cookware having a core layer of perforated graphite between at least two metal layers metallurgically bonded together. A method for making the cookware using a solid state bonding technique is also disclosed.

Description of Related Art

It has long been known to manufacture multi-layer bonded composite cookware in which various materials are joined together to combine the desired physical properties of each of the materials into a composite. For example, the corrosion resistance of stainless steel is desirable for the cooking surface as well as for the exterior surface of cookware; however, the thermal conductivity of stainless steel is relatively low. On the other hand, aluminum and/or copper offer comparably higher thermal conductivities and have been bonded to stainless steel to provide well-known composite cookware items such as pots, pans, and the like. Multi-layer bonded cookware is known in the art, as shown in a number of patents, such as, for example: U.S. Pat. Nos. 4,246,045 and 4,167,606 to Ulam; and U.S. Pat. Nos. 8,133,596 and 6,267,830 to Groll. These references demonstrate the manufacture of multi-layer bonded cookware having stainless steel outer layers bonded to central layer(s) of a higher conductivity aluminum and/or copper. The bonding between layers of these different materials is commonly achieved by conventional roll-bonding techniques using strips of aluminum and/or copper, roll-bonded to outer strips of stainless steel.

A solid state bonding technique using high static pressure and heat applied over time to make a plurality of composite blanks of, for example, a combination of stainless steel—aluminum—stainless steel in manufactured cookware, is disclosed in U.S. Pat. No. 9,078,539 to Groll et al. There is a continued need in the art for producing cookware made using solid state bonding techniques for reducing the weight and improving thermal characteristics of the cookware.

SUMMARY OF THE DISCLOSURE

In view of the existing need in the art, it is desirable to develop new methods of producing cookware using solid state bonding techniques. It is further desirable to provide cookware made by such methods, wherein the cookware has reduced weight and improved thermal characteristics over existing cookware made by solid state bonding techniques.

In accordance with some embodiments or aspects of the present disclosure, cookware made from a bonded multi-layer blank assembly may have a first metal layer; a second metal layer having a cavity with a plurality of spaced-apart posts protruding from a bottom surface of the cavity; and a perforated graphite layer having a thickness of at least 0.010 in. (0.254 mm) and a plurality of spaced-apart holes formed therethrough. The perforated graphite layer may be positioned within the cavity of the second metal layer such that the plurality of spaced-apart posts extends through the plurality of spaced-apart holes. The second metal layer may be metallurgically bonded to the first metal layer at least via the plurality of spaced-apart posts.

In accordance with some embodiments or aspects of the present disclosure, a surface of the second metal layer surrounding the cavity may be metallurgically bonded to the first metal layer. Preferably said surface would be planar. A depth of the cavity may be smaller, the same, or larger than the thickness of the perforated graphite layer. The plurality of spaced-apart posts may have a circular cross-section or a polygonal cross-section.

In accordance with some embodiments or aspects of the present disclosure, the perforated graphite layer may be made from anisotropic graphite. The first metal layer may be made of aluminum, stainless steel, or titanium. The second metal layer may be made of aluminum.

In accordance with some embodiments or aspects of the present disclosure, a third metal layer may be metallurgically bonded to a planar side of the second metal layer opposite the cavity. The third metal layer may be made of stainless steel.

In accordance with some embodiments or aspects of the present disclosure, the second metal layer may have an outer metal layer and a central metal layer received within a central opening of the outer metal layer. The cavity may be provided on the central metal layer. The outer metal layer may be thinner than the central metal layer.

In accordance with some embodiments or aspects of the present disclosure, the first metal layer may have a first sub-layer made of aluminum bonded to the spaced-apart posts and a second sub-layer made of stainless steel. The second metal layer may be metallurgically bonded to the first sub-layer of the first metal layer. A surface of the second metal layer surrounding the cavity may be metallurgically bonded to the first sub-layer of the first metal layer. Preferably said surface would be planar.

In accordance with some embodiments or aspects of the present disclosure, a method of making cookware may include (a) providing a first metal layer; (b) providing a perforated graphite layer having a thickness of at least 0.010 in. (0.254 mm) and a plurality of spaced-apart holes formed therethrough, (c) providing a second metal layer having a cavity with a plurality of spaced-apart posts protruding from a bottom surface of the cavity; (d) stacking the layers provided in (a)-(c) in a blank assembly such that the perforated graphite layer is received within the cavity of the second metal layer whereby the plurality of spaced-apart posts of the second metal layer are aligned with and pass through the plurality of spaced-apart holes in the perforated graphite layer such that a lower surface of the first metal layer contacts at least an upper surface of upper end portions of the plurality of spaced-apart posts; and (e) pressing the blank assembly by applying a force in a direction perpendicular to a plane of the layers in the blank assembly and concurrently heating the blank assembly to achieve a metallurgical bond between the first metal layer and the second metal layer at least via the plurality of spaced-apart posts to provide a bonded blank assembly.

In accordance with some embodiments or aspects of the present disclosure, the method may further include (f) cooling the bonded blank assembly; and (g) forming the bonded blank assembly into the cookware. The first metal layer may be made of aluminum, stainless steel, or titanium, and the second metal layer may be made of aluminum.

In accordance with some embodiments or aspects of the present disclosure, the method may further include (h) providing a third metal layer and stacking the third metal layer with the layers of the blank assembly prior to pressing the blank assembly such that the third metal layer faces a planar side of the second metal layer opposite the cavity.

In accordance with some embodiments or aspects of the present disclosure, the method may further include (i) providing a fourth metal layer and stacking the fourth metal layer on top of the first metal layer of the blank assembly prior to pressing the blank assembly. The third metal layer and the fourth metal layer may be made of stainless steel.

These and other features and characteristics of the cookware described herein, as well as methods of making such cookware, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only. Hence, specific dimensions and other physical characteristics related to the embodiments disclosed herein are not to be considered as limiting. Further, it is to be understood that the disclosure may assume various alternative variations and step sequences, except where expressly specified to the contrary.

BRIEF DESCRIPTION OF THE DRAWINGS

FIG. 5 is a cross-sectional view of a formed fry pan shape made from the bonded blank assembly of FIG. 1;

FIG. 6 is an enlarged view of Detail B shown in FIG. 5;

FIG. 7 is an enlarged view of Detail C shown in FIG. 5;

FIG. 11 is a cross-sectional view of a formed fry pan shape made from the bonded blank assembly of FIG. 8;

FIG. 12 is an enlarged view of Detail E shown in FIG. 11;

FIG. 13 is an enlarged view of Detail F shown in FIG. 11;

FIG. 17 is a cross-sectional view of a formed fry pan shape made from the bonded blank assembly of FIG. 14;

FIG. 18 is an enlarged view of Detail H shown in FIG. 17;

FIG. 19 is an enlarged view of Detail I shown in FIG. 17;

In FIGS. 1-22, the same characters represent the same components unless otherwise indicated.

DETAILED DESCRIPTION OF THE EMBODIMENTS

Figure 1:
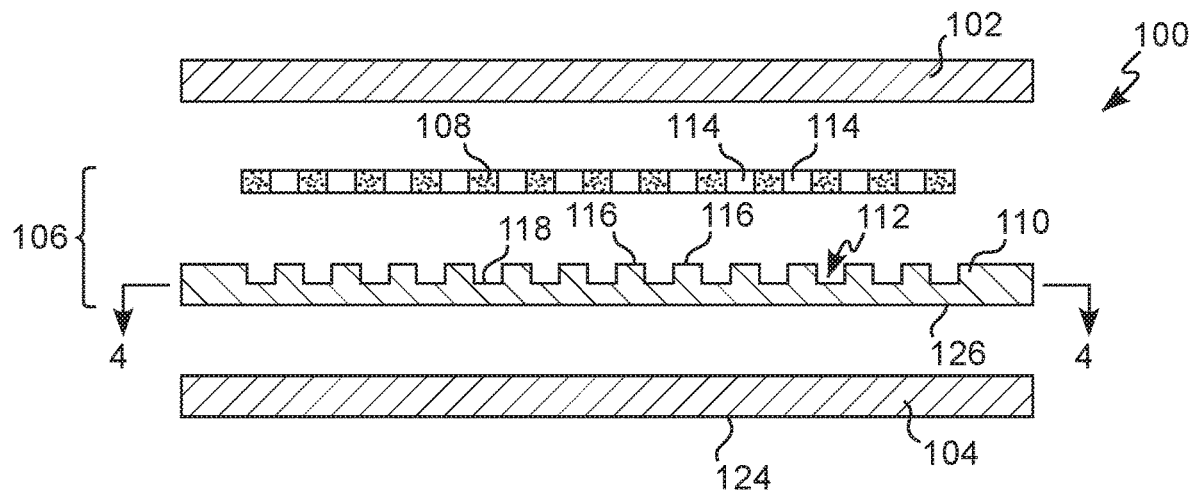
FIG. 1 is an exploded side cross-sectional view of a blank assembly for making cookware in accordance with some embodiments or aspects of the present disclosure.

As used in the specification and the claims, the singular form of "a", "an", and "the" include plural referents unless the context clearly dictates otherwise.

For purposes of the description hereinafter, the terms "end", "upper", "lower", "right", "left", "vertical", "horizontal", "top", "bottom", "lateral", "longitudinal" and derivatives thereof shall relate to the disclosure as it is oriented in the drawing figures. However, it is to be understood that the disclosure may assume various alternative variations and step sequences, except where expressly specified to the contrary.

All numbers and ranges used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

All documents, such as but not limited to issued patents and patent applications, referred to herein, and unless otherwise indicated, are to be considered to be "incorporated by reference" in their entirety.

The terms "first", "second", and the like are not intended to refer to any particular order or chronology, but refer to different conditions, properties, or elements.

The term "at least" is synonymous with "greater than or equal to".

As used herein, "at least one of" is synonymous with "one or more of". For example, the phrase "at least one of A, B, and C" means any one of A, B, or C, or any combination of any two or more of A, B, or C. For example, "at least one of A, B, and C" includes one or more of A alone; or one or more of B alone; or one or more of C alone; or one or more of A and one or more of B; or one or more of A and one or more of C; or one or more of B and one or more of C; or one or more of all of A, B, and C.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

As used herein, the term "solid state bonding" means a method of bonding two or more stacked layers of metals or metal alloys together using high pressure (typically over 5,000 psi (34.5 MPa)) and high temperature (typically over 600° F. (315° C.)), wherein the high pressure is applied in a normal or perpendicular direction, i.e., 90° relative to the plane of the stacked layers.

As used herein, the term "metallurgical bonding" or "metallurgically bonded" refers to a bond formed between similar or dissimilar metal materials that is free of voids or discontinuities at a bonding interface.

Figure 2:
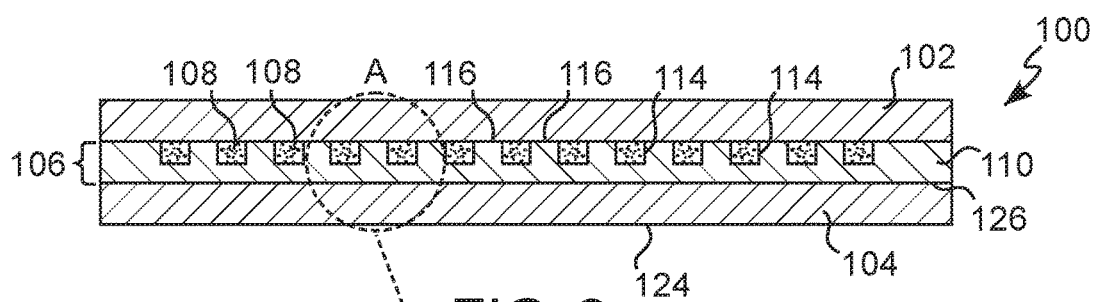
FIG. 2 is an assembled side cross-sectional view of the blank assembly of FIG. 1.
Figure 3:
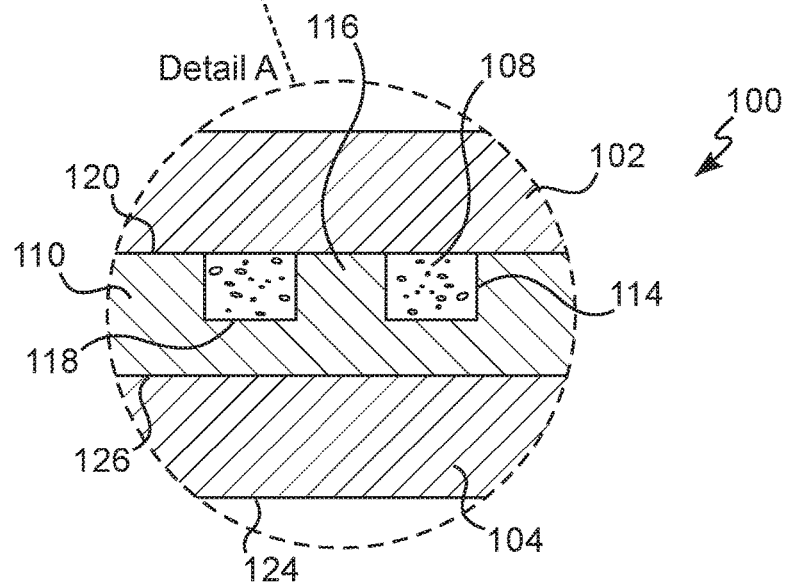
FIG. 3 is an enlarged view of Detail A shown in FIG. 2.

With reference to the drawings, FIGS. 1-3 depict various views of a blank assembly 100 used in making some embodiments of cookware described in the present disclosure. In some embodiments or aspects, each blank assembly 100 may be used to form a piece of cookware, such as a pot or a frying pan depicted in FIGS. 5-7. As discussed herein, the blank assembly 100 is formed from a plurality of stacked discs or layers that are metallurgically bonded together to form an integral blank assembly 100. In some embodiments or aspects, the plurality of stacked discs or layers may be stacked such that the individual discs are substantially parallel to each other. The stacked assembly of discs or layers may then be bonded together using a solid state bonding technique, wherein the stacked discs or layers are bonded using high pressure (typically over 5,000 psi (34.5 MPa)) and high temperature (typically over 600° F. (315° C.)). Desirably, the high pressure is applied in a perpendicular direction, i.e., 90° relative to the plane of the stacked discs or layers. The bonded discs or layers constitute a bonded multi-layer blank assembly 100. Bonded multi-layer blank assembly 100 is shown on FIGS. 2-3.

With continued reference to FIGS. 1-3, the blank assembly 100 has at least one upper (first) metal disc or layer 102 (hereinafter referred to as "first metal layer 102") and at least one lower (third) metal disc or layer 104 (hereinafter referred to as "third metal layer 104"). A second disc or layer 106 (hereinafter referred to as "second layer 106") is disposed between the first metal layer 102 and the third metal layer 104. An upper or top surface of the first metal layer 102 forms an inner surface of the cookware while a lower or bottom surface of the third metal layer 104 forms an outer surface of the cookware. In some embodiments or aspects, the arrangement of layers in the blank assembly 100 can be flipped 180° such that a lower or bottom surface of the first metal layer 102 forms the outer surface of the cookware and an upper or top surface of the third metal layer 104 forms the inner surface of the cookware.

With continued reference to FIGS. 1-3, the material from which the first metal layer 102 is selected to have desirable scratch resistance, wear, and thermal properties required for a cooking surface of the cookware. In some embodiments or aspects, the first metal layer 102 may be formed from a food-grade stainless steel. The stainless steel of the first metal layer 102 may be, for example, a 400 series stainless steel, such as a 436 stainless steel, or 300 series stainless steel, such as a 304 stainless steel. In some embodiments or aspects, the stainless steel of the first metal layer 102 may be any corrosion-resistant stainless steel alloy suitable for use as a food preparation surface. In further embodiments or aspects, the first metal layer 102 may be made from a titanium alloy suitable for use as a food preparation surface. The material of the first metal layer 102 may be aluminum. In some embodiments or aspects, the material of the first metal layer 102 may be, for example, a high purity aluminum, or an alloyed aluminum material clad with thin pure layers of aluminum on one or both sides to accommodate metallurgical bonding. In some embodiments or aspects, the material of the first metal layer 102 may be a 1000 series aluminum alloy, such as an 1100 aluminum alloy.

In some embodiments or aspects, the first metal layer 102 may be a disc having a diameter of about 14 inches (355.6 mm) to form a near-net size blank for making a fry pan of 10 inches (254 mm) in diameter. In other embodiments or aspects, the first metal layer 102 may be a disc having a diameter of about 5 inches to about 20 inches (127 mm to 508 mm) to form cookware of various sizes. The diameter of the first metal layer 102 is selected to be large enough to form the bottom, sidewalls, and rim of the finished cookware. The diameter of the first metal layer 102 is selected such that it matches the diameter of at least one of the second layer 106 and the third metal layer 104. In some embodiments or aspects, a thickness of the first metal layer 102 may be about 0.010 inches (0.25 mm) to about 0.025 inches (0.65 mm), such as about 0.015 inches (0.40 mm). One of ordinary skill in the art would readily appreciate that the diameter and thickness of the first metal layer 102 can be increased or decreased to make fry pans of larger or smaller diameter and thickness, respectively.

Figure 20:
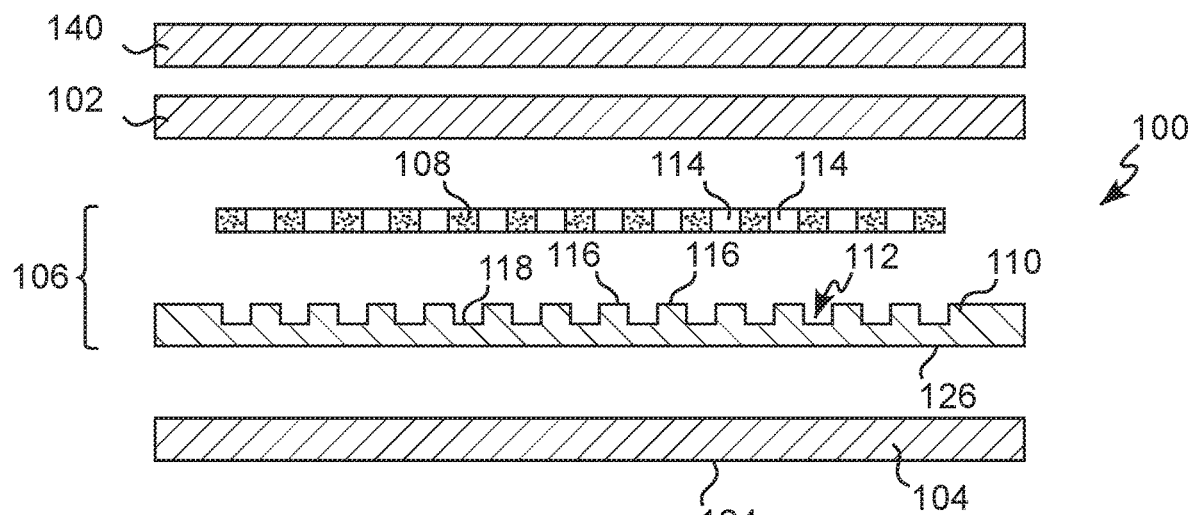
FIG. 20 is an exploded side cross-sectional view of a blank assembly for making cookware in accordance with some embodiments or aspects of the present disclosure.
Figure 21:
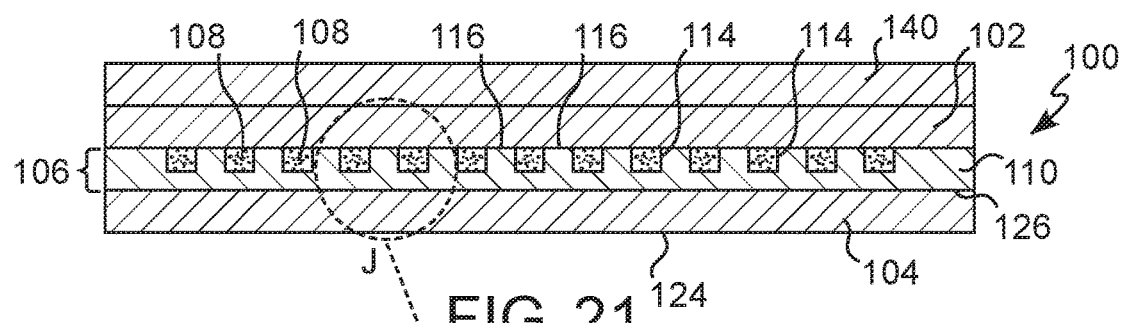
FIG. 21 is an assembled side cross-sectional view of the blank assembly of FIG. 20.
Figure 22:
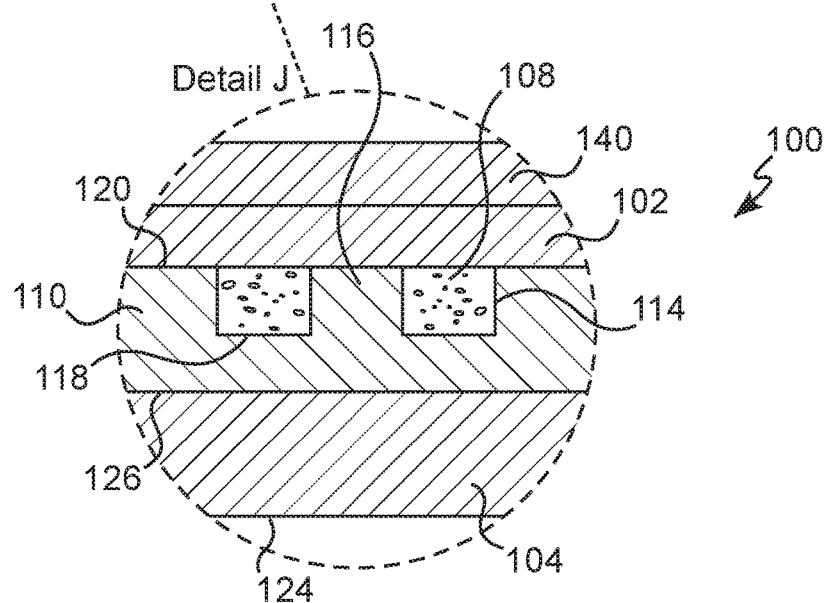
FIG. 22 is an enlarged view of Detail J shown in FIG. 21.

In some embodiments or aspects, such as shown in FIGS. 20-22, the blank assembly 100 may include a fourth metal layer 140 stacked on the first metal layer 102. The first metal layer 102 may be made from a material that has a bonding affinity to the metal materials of the fourth metal layer 140 and of the second layer 106, as discussed herein. In further embodiments or aspects, the blank assembly 200, 300 (shown in FIGS. 8-10 and 14-16) may also include a fourth metal layer (not shown) stacked on the first metal layer 202, 302. The material of the first metal layer 102, 202, 302 may be aluminum. In some embodiments or aspects, the material of the first metal layer 102, 202, 302 may be, for example, a high purity aluminum, or an alloyed aluminum material clad with thin pure layers of aluminum on either side to accommodate metallurgical bonding. In some embodiments or aspects, the material of the first metal layer 102, 202, 302 may be a 1000 series aluminum alloy, such as an 1100 aluminum alloy. In some embodiments or aspects, a thickness of the first metal layer 102, 202, 302 may be about 0.020 inches (0.5 mm) to about 0.100 inches (2.5 mm), such as about 0.040 inches (1.0 mm).

With continued reference to FIGS. 20-22, the material of the fourth metal layer 140 is selected to have desirable scratch resistance, wear, and thermal properties required for a cooking surface of the cookware. In some embodiments or aspects, the material of the fourth metal layer 140 may be a food-grade stainless steel. The stainless steel of the fourth metal layer 140 may be, for example, a 400 series stainless steel, such as a 436 stainless steel, or 300 series stainless steel, such as a 304 stainless steel. In some embodiments or aspects, the stainless steel of the fourth metal layer 140 may be any corrosion-resistant stainless steel alloy suitable for use as a food preparation surface. In further embodiments or aspects, the fourth metal layer 140 may be made from a titanium alloy suitable for use as a food preparation surface. In some embodiments or aspects, a thickness of the fourth metal layer 140 may be about 0.010 inches (0.25 mm) to about 0.025 inches (0.65 mm), such as about 0.015 inches (0.4 mm).

In some embodiments or aspects, the third metal layer 104 may be made from a material that has desirable scratch resistance, wear, and thermal properties required for an outside surface of the cookware. The material of the third metal layer 104 is selected such that it has a bonding affinity to the metal material of at least a portion of the second layer 106, as discussed herein. In some embodiments or aspects, the third metal layer 104 may be made of a ferro-magnetic stainless steel, such as a 400 grade, in order to make the finished cookware suitable for use on an induction cooking apparatus. The stainless steel of the third metal layer 104 may be, for example, a magnetic grade of stainless steel, such as a 430 stainless steel. In some embodiments or aspects, the stainless steel of the third metal layer 104 may be any stainless steel alloy suitable for use as a food preparation surface. In further embodiments or aspects, the third metal layer 104 may be made from a titanium alloy suitable for use as a food preparation surface. The material of the third metal layer 104 may be selected to have similar or identical material properties to that of the first metal layer 102.

In some embodiments or aspects, the third metal layer 104 may be a disc having a diameter of about 14 inches (355.6 mm) to form a near-net size blank for making a fry pan of 10 inches (254 mm) in diameter. In other embodiments or aspects, the third metal layer 104 may be a disc having a diameter of about 5 inches to about 20 inches (127 mm to 508 mm) to form cookware of various sizes. The diameter of the third metal layer 104 is selected to be large enough to form the bottom, sidewalls, and rim of the finished cookware. In some embodiments or aspects, a thickness of the third metal layer 104 may be about 0.010 inches (0.25 mm) to about 0.025 inches (0.6 mm), such as about 0.015 inches (0.4 mm). One of ordinary skill in the art would readily appreciate that the diameter and thickness of the third metal layer 104 can be increased or decreased to make fry pans of larger or smaller diameter and thickness, respectively. A bottom surface 124 of the third metal layer 104 may be substantially planar and without any protrusions or recesses.

With continued reference to FIGS. 1-3, the second layer 106 is disposed between the first metal layer 102 and the third metal layer 104. The second layer 106 has a perforated graphite disc or layer 108 (hereinafter referred to as "perforated graphite layer 108") having a plurality of spaced-apart holes 114 formed therethrough. The second layer 106 further has a second metal disc or layer 110 (hereinafter referred to as "second metal layer 110") having a cavity 112 configured to receive the perforated graphite layer 108.

In some embodiments or aspects, the second metal layer 110 may be made from a material that has a bonding affinity to the metal materials of the first metal layer 102 and the third metal layer 104, as discussed herein. The material of the second metal layer 110 may be aluminum. In some examples or aspects, the second metal layer 110 may be made from a high purity aluminum, or an alloyed aluminum material clad with thin pure layers of aluminum on either side to accommodate metallurgical bonding. In some embodiments or aspects, the second metal layer 110 may be made of, for example, a 1000 series aluminum alloy, such as an 1100 aluminum alloy.

In some embodiments or aspects, the second metal layer 110 may be a disc having a diameter of about 14 inches (355.6 mm) to form a near-net size blank for making a fry pan of 10 inches (254 mm) in diameter. In other embodiments or aspects, the second metal layer 110 may be a disc having a diameter of about 5 inches to about 20 inches (127 mm to 508 mm) to form cookware of various sizes. The diameter of the second metal layer 110 is selected to be large enough to form the bottom, sidewalls, and rim of the finished cookware. In some embodiments or aspects, a thickness of the second metal layer 110 may be about 0.020 inches (0.5 mm) to about 0.200 inches (5.0 mm), such as about 0.040 inches (1.0 mm). One of ordinary skill in the art would readily appreciate that the diameter and thickness of the second metal layer 110 can be increased or decreased to make fry pans of larger or smaller diameter and thickness, respectively. A bottom surface 126 of the second metal layer 110 may be substantially planar and without any protrusions or recesses.

In some embodiments or aspects, the cavity 112 may have a circular shape having a diameter that is the same or slightly larger than a diameter of a circularly-shaped perforated graphite layer 108. For example, the cavity 112 may have a diameter of about 3 inches (76.2 mm) to about 12 inches (305 mm), such as about 7 inches (178 mm). The perforated graphite layer 108 may have a corresponding diameter of about 90-99.9% of the diameter of the cavity 112. In other embodiments or aspects, the cavity 112 may have any desired geometric shape that corresponds to any desired geometric shape of the perforated graphite layer 108. The cavity 112 may have depth (i.e. distance at which the cavity 112 is recessed relative to an upper surface 120 of the second metal layer 110) of about 0.010 inches (0.25 mm) to about 0.100 inches (2.5 mm), such as about 0.020 inches (0.5 mm). The cavity may have a uniform depth or a non-uniform depth, wherein the depth varies over at least a portion of the cavity 112. In some embodiments or aspects, the cavity 112 may be centered on the second metal layer 110 such that the cavity 112 and the second metal layer 110 share a common axis. One of ordinary skill in the art would readily appreciate that the diameter and depth of the cavity 112 can be increased or decreased to accommodate a larger and thicker perforated graphite layer 108, respectively.

Figure 4:
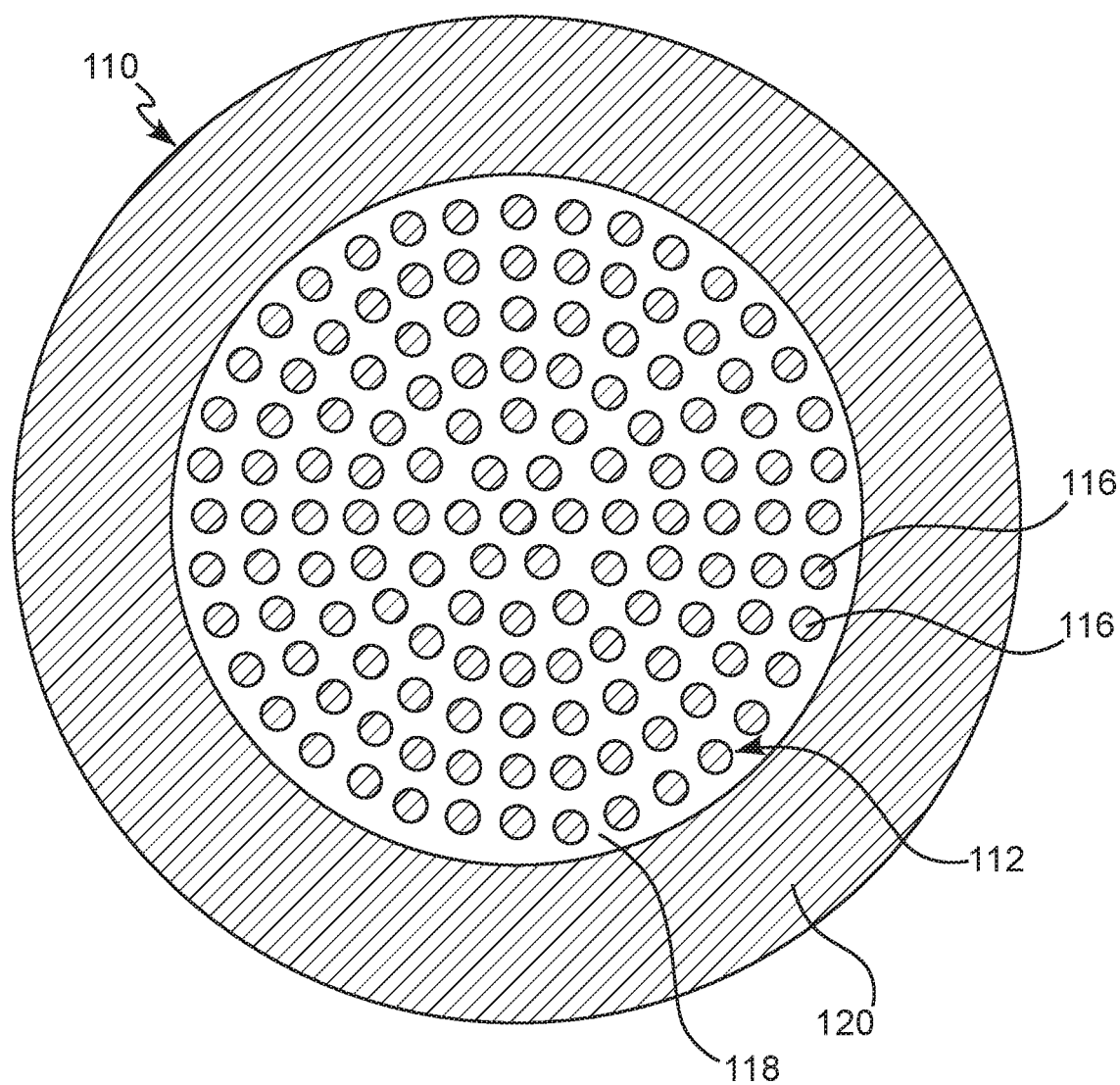
FIG. 4 is a top view of an intermediate layer shown in FIG. 1

The second metal layer 110 has a plurality of upwardly protruding, spaced-apart posts 116 (hereinafter referred to as "posts 116") within the cavity 112. The posts 116 extend upwardly from a bottom surface 118 of the cavity 112 which is recessed relative to an upper surface 120 of the second metal layer 110. As shown in FIG. 4, the posts 116 may be arranged in an ordered array or distributed randomly within the cavity 112. For example, the posts 116 may be arranged in a circular array with an equal or unequal spacing between adjacent posts 116. In various embodiments or aspects, the density of the posts 116 (i.e., number of posts 116 per unit area) may be uniform across the cavity 112, or it may vary between different portions of the cavity. For example, the density of the posts 116 may increase or decrease in a radial direction of the cavity 112. In some embodiments or aspects, the posts 116 may be provided in one or more groupings of posts 116. The posts 116 may have the same size (i.e., diameter) or a different size relative to each other.

With reference to FIG. 4, the cavity 112 and the posts 116 may be formed by removing the material from the upper surface 120 of the second metal layer 110, such as by milling. In some embodiments or aspects, the cavity 112 and the posts 116 may be cast using a mold. The posts 116 may have a circular cross-sectional shape, a polygonal shape (such as a hexagonal shape), or any other geometric shape.

In some embodiments or aspects, the posts 116 may have a height of about 0.010 inches (0.254 mm) to about 0.100 inches (2.54 mm), such as about 0.020 inches (0.508 mm) above the bottom surface 118 of the cavity 112. In some embodiments or aspects, the height of the posts 116 is selected to be slightly higher than a thickness of the perforated graphite layer 108 such that peaks of the posts 116 protrude through the holes in the perforated graphite layer 108, as described herein. In embodiments or aspects where the posts 116 have a circular shape, the posts 116 may have a diameter of about 0.050 inches (1.27 mm) to about 0.250 inches (6.35 mm), such as about 0.125 inches (3.175 mm). In other embodiments or aspects where the posts 116 have a non-circular shape, the posts 116 may have a surface area of about 0.002 in$^2$ (1.3 mm$^2$) to about 0.050 in$^2$ (32 mm$^2$), such as about 0.12 in² (7.9 mm²). In some embodiments or aspects, the posts 116 may have a uniform width or diameter along their longitudinal length measured in a direction from the bottom surface 118 of the cavity 112 toward the upper surface 120. In other embodiments or aspects, the width or diameter of the posts may narrow or widen in a direction from the bottom surface 118 of the cavity 112 toward the upper surface 120.

In some embodiments or aspects, the perforated graphite layer 108 may be made of anisotropic graphite that is configured to transmit thermal energy primarily in a radial (rather than axial) direction. In this manner, the cooking surface can be heated uniformly, while avoiding hot spots. Graphite is preferably selected due to its high coefficient of thermal conductivity (approximately 500-1500 W/mK versus approximately 220 W/mK for aluminum and 340 W/mK for copper). Anisotropic graphite can have approximately 2-6 times the thermal conductivity compared to copper in a direction of the XY plane defining the cooking surface. The anisotropic graphite is also approximately ⅙ the weight of copper and acts as an insulator in the Z direction (i.e., substantially perpendicular to the cooking surface) compared to copper. The low conductivity in the Z direction (approximately 100 times less than in the XY plane) acts as a thermal dam that momentarily impedes the direct flow-through of heat from the heat source to the food preparation surface, thus giving the heat energy additional time to evenly spread along the cooking surface. The perforated graphite layer 108 is effective in spreading heat evenly across the cooking surface while impeding heat flow in a direction perpendicular to the cooking surface. Without intending to be bound by theory, it has been found that the presence of the perforated graphite layer 108 increases the resistance to current flow, thereby increasing the induction heating effectiveness compared to cookware without the perforated graphite layer 108.

In some embodiments or aspects, the perforated graphite layer 108 may have a circular shape with a diameter of about 3 inches (76.2 mm) to about 12 inches (305 mm), such as about 7 inches (178 mm). As noted herein, the perforated graphite layer 108 may have a corresponding diameter of about 90-99.9% of the diameter of the cavity 112. In other embodiments or aspects, the perforated graphite layer 108 may have any desired geometric shape that corresponds to any desired geometric shape of the cavity 112. The perforated graphite layer 108 may have a thickness of about 0.010 inches (0.25 mm) to about 0.100 inches (2.5 mm), such as about 0.020 inches (0.5 mm). The perforated graphite layer 108 may have a minimum thickness of about 0.010 inches (0.25 mm). Without intending to be bound by theory, it has been found that the perforated graphite layer 108 with a thickness below the minimum thickness may be damaged during the solid state bonding process, thereby compromising its ability to evenly distribute heat along the cooking surface of the cookware. Furthermore, the perforated graphite layer 108 having at least the minimum thickness is easier to handle and cheaper to manufacture than perforated graphite layers with a smaller thickness than the minimum thickness, thereby reducing the overall cost of the cookware. In addition, the perforated graphite layer 108 having at least the minimum thickness is configured to move more energy in the plane defining the cooking surface than perforated graphite layer having a smaller thickness than the minimum thickness. In some embodiments or aspects, the thickness of the perforated graphite layer 108 is selected to be smaller than a height of the posts 116 of the second metal layer 110. In this manner, upper surface of the perforated graphite layer 108 may be recessed within the cavity 112 relative to the upper surface 120 of the second metal layer 110 and the peaks of the posts 116.

In some embodiments or aspects, the thickness of the perforated graphite layer 108 is selected to be smaller than a height of the posts 116/depth of the cavity 112 of the second metal layer 110. In this manner, upper surface of the perforated graphite layer 108 may be recessed within the cavity 112 relative to the upper surface 120 of the second metal layer 110 and the peaks of the posts 116. In other embodiments or aspects, the thickness of the perforated graphite layer 108 is selected to be the same as the height of the posts 116/depth of the cavity 112. In further embodiments or aspects, the thickness of the perforated graphite layer 108 may be selected to be slightly larger than a height of the posts 116/depth of the cavity 112 of the second metal layer 110. In this manner, upper surface of the perforated graphite layer 108 may protrude slightly from the cavity 112 relative to the upper surface 120 of the second metal layer 110 and the peaks of the posts 116. Due to the perforated graphite layer 108 being more compressible than the first and second metal layers 102, 110, the perforated graphite layer 108 is compressed into the cavity 112 during the solid state bonding process.

With continued reference to FIGS. 1-3, each of the holes 114 extends through the material of the perforated graphite layer 108 between its upper surface and its lower surface. The size and arrangement of the holes 114 in the perforated graphite layer 108 is selected to correspond to the size and arrangement of the posts 116 on the second metal layer 110. In this manner, the posts 116 can be arranged such that all of the posts 116 are registered (i.e., in alignment) with all of the holes 114, with each post 116 being received within the respective hole 114. For example, in embodiments where the posts 116 are arranged in a circular array with a uniform spacing of posts 116 across the cavity 112 of the second metal layer 110, the holes 114 have a corresponding circular array arrangement such that the posts 116 can be received within the holes 114. The holes 114 are shaped such that a single post 116 may be received within a single hole 114. In some embodiments or aspects, a plurality of posts 116 may be received within a single hole 114. In further embodiments or aspects, the number of holes 114 may be larger than the number of posts 116, such that some holes 114 do not have posts 116 therein.

The holes 114 may have the same or different shape as the posts 116. For example, the holes 114 may have a circular shape to receive a circular or a non-circular post 116. In embodiments or aspects where the holes 114 have a circular shape, the holes 114 may have a diameter of about 0.050 inches (1.27 mm) to about 0.250 inches (6.35 mm), such as about 0.125 inches (3.175 mm). The holes 114 may have the same or different size and shape.

Figure 8:
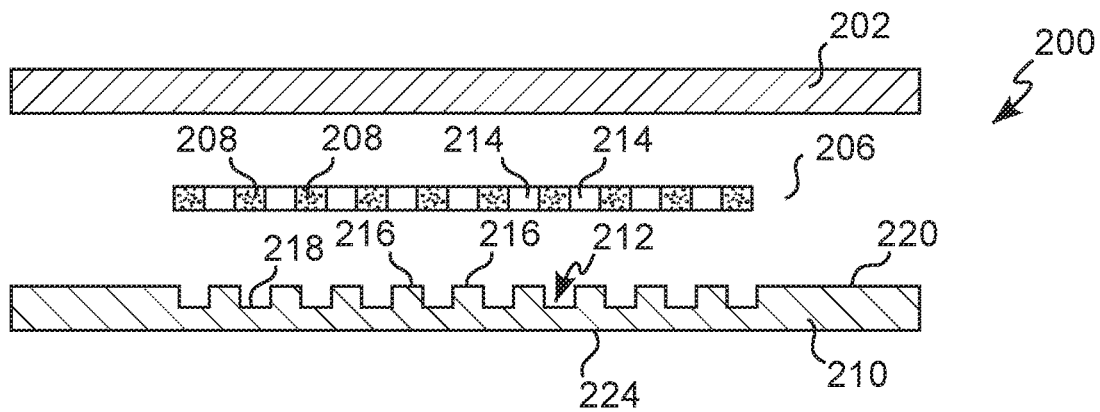
FIG. 8 is an exploded side cross-sectional view of a blank assembly for making cookware in accordance with some embodiments or aspects of the present disclosure.
Figure 9:
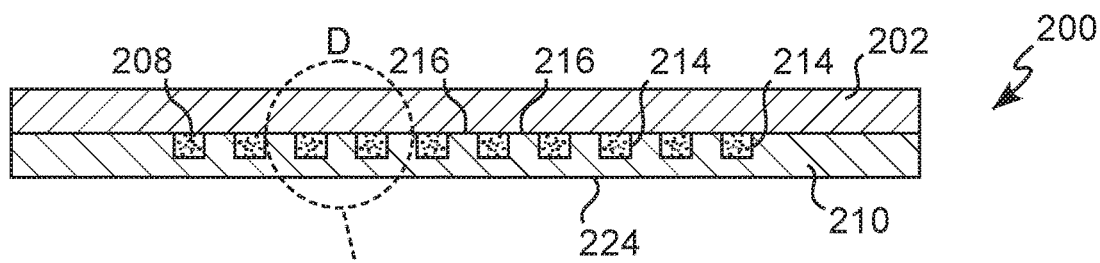
FIG. 9 is an assembled side cross-sectional view of the blank assembly of FIG. 8.
Figure 10:
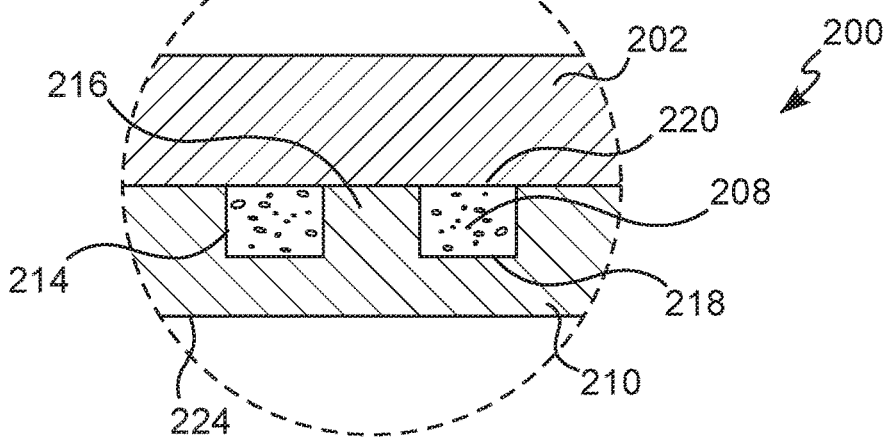
FIG. 10 is an enlarged view of Detail D shown in FIG. 9.

With reference to FIGS. 8-10, a blank assembly 200 is shown in accordance with another embodiment or aspect of the present disclosure. The components of the blank assembly 200 shown in FIGS. 8-10 are substantially similar to the components of the blank assembly 100 described herein with reference to FIGS. 1-3. Reference numerals in FIGS. 8-10 are used to illustrate identical components of the corresponding reference numerals in FIGS. 1-3, with the exception that the first digit of each reference number is replaced with a number 2. For example, whereas the first metal layer shown in FIGS. 1-3 is identified by a reference number 102, the same first metal layer shown in FIGS. 8-10 is identified by reference number 202. As the previous discussion regarding the components of the blank assembly 100 generally shown in FIGS. 1-3 is applicable to the blank assembly 200 shown in FIGS. 8-10, only the relative differences between the two blank assemblies are discussed hereinafter. Bonded multi-layer blank assembly 200 is shown on FIGS. 9-10.

With reference to FIGS. 8-10, the blank assembly 200 has at least one upper (first) metal disc or layer 202 (hereinafter referred to as "first metal layer 202") and at least one lower (second) metal disc or layer 210 (hereinafter referred to as "second metal layer 210"). A core disc or layer 206 (hereinafter referred to as "core layer 206") is disposed between the first metal layer 202 and the second metal layer 210. An upper or top surface of the first metal layer 202 forms an inner surface of the cookware while a lower or bottom surface of the second metal layer 210 forms an outer surface of the cookware.

The first metal layer 202 may be formed from a food-grade stainless steel, such as a 400 series stainless steel, such as 436 stainless steel, or a 300 series stainless steel, such as a 304 stainless steel, or from a titanium alloy suitable for use as a food preparation surface. The material of the first metal layer 202 may be aluminum. In some embodiments or aspects, the first metal layer 202 may be formed from a high purity aluminum, or an alloyed aluminum material clad with thin pure layers of aluminum on either side to accommodate metallurgical bonding. In some embodiments or aspects, the first metal layer 202 may be made of, for example, a 1000 series aluminum alloy, such as an 1100 aluminum alloy. The material of the second metal layer 210 is selected such that it has a bonding affinity to the metal material of the first metal layer 202. The material of the second metal layer 210 may be aluminum. In some embodiments or aspects, the second metal layer 210 may be made of, for example, a high purity aluminum, or an alloyed aluminum material clad with thin pure layers of aluminum on either side to accommodate metallurgical bonding. In some embodiments or aspects, the second metal layer 210 may be made of, for example, a 1000 series aluminum alloy, such as an 1100 aluminum alloy. A bottom surface 224 of the second metal layer 210 may be substantially planar and without any protrusions or recesses.

With continued reference to FIGS. 8-10, the core layer 206 is disposed between the first metal layer 202 and the second metal layer 210. The core layer 206 is a perforated graphite disc or layer 208 (hereinafter referred to as "perforated graphite layer 208") having a plurality of spaced-apart holes 214 formed therethrough. Whereas the second layer 106 in FIGS. 1-3 has a second metal layer 110 and a perforated graphite layer 108 received within a cavity 112 on the second metal layer 110, the core layer 206 in FIGS. 8-10 only has the perforated graphite layer 208. The perforated graphite layer 208 is configured for being received within a cavity 212 that is recessed relative to an upper surface 220 of the second metal layer 210.

In some embodiments or aspects, the cavity 212 may have a circular shape having a diameter that is the same or slightly larger than a diameter of a circularly-shaped perforated graphite layer 208. In other embodiments or aspects, the cavity 212 may have any desired geometric shape that corresponds to any desired geometric shape of the perforated graphite layer 208. In some embodiments or aspects, the cavity 212 may be centered on the second metal layer 210 such that the cavity 212 and the second metal layer 210 share a common axis.

With continued reference to FIGS. 8-10, a plurality of spaced-apart posts 216 (hereinafter referred to as "posts 216") protrude upwardly from a bottom surface 218 of the cavity 212. Similar to the posts 116 shown in FIG. 4, the posts 216 may be arranged in an ordered array or distributed randomly within the cavity 212. The posts 216 may have a circular cross-sectional shape, a polygonal shape (such as a hexagonal shape), or any other geometric shape.

In some embodiments or aspects, the perforated graphite layer 208 may be made of anisotropic graphite that is configured to transmit thermal energy primarily in a radial (rather than axial) direction. In this manner, the cooking surface can be heated uniformly, while avoiding hot spots. As described herein with the embodiment shown in FIGS. 1-4, the perforated graphite layer 208 may have a minimum thickness of about 0.010 inches (0.25 mm). Without intending to be bound by theory, it has been found that the perforated graphite layer 208 with a thickness below the minimum thickness may be damaged during the solid state bonding process, thereby compromising its ability to evenly distribute heat along the cooking surface of the cookware. Furthermore, the perforated graphite layer 208 having at least the minimum thickness is easier to handle and cheaper to manufacture than perforated graphite layers with a smaller thickness than the minimum thickness, thereby reducing the overall cost of the cookware. In addition, the perforated graphite layer 208 having at least the minimum thickness is configured to move more energy in the plane defining the cooking surface than perforated graphite layer having a smaller thickness than the minimum thickness. In some embodiments or aspects, the thickness of the perforated graphite layer 208 is selected to be smaller than a height of the posts 216/depth of the cavity 212 of the second metal layer 210. In this manner, upper surface of the perforated graphite layer 208 may be recessed within the cavity 212 relative to the upper surface 220 of the second metal layer 210 and the peaks of the posts 216. In other embodiments or aspects, the thickness of the perforated graphite layer 208 is selected to be the same as the height of the posts 216/depth of the cavity 212. In further embodiments or aspects, the thickness of the perforated graphite layer 208 may be selected to be slightly larger than a height of the posts 216/depth of the cavity 212 of the second metal layer 210. In this manner, upper surface of the perforated graphite layer 208 may protrude slightly from the cavity 212 relative to the upper surface 220 of the second metal layer 210 and the peaks of the posts 216. Due to the perforated graphite layer 208 being more compressible than the first and second metal layers 202, 210, the perforated graphite layer 208 is compressed into the cavity 212 during the solid state bonding process.

With continued reference to FIGS. 8-10, each of the holes 214 extends through the material of the perforated graphite layer 208 between its upper surface and its lower surface. The size and arrangement of the holes 214 in the perforated graphite layer 208 is selected to correspond to the size and arrangement of the posts 216 on the second metal layer 210. In this manner, the posts 216 can be arranged such that all of the posts 216 are registered (i.e., in alignment) with all of the holes 214, with each post 216 being received within the respective hole 214. In some embodiments or aspects, a plurality of posts 216 may be received within a single hole 214. In further embodiments or aspects, the number of holes 214 may be larger than the number of posts 216, such that some holes 214 do not have posts 216 therein. The holes 214 may have the same or different shape as the posts 216.

Figure 14:
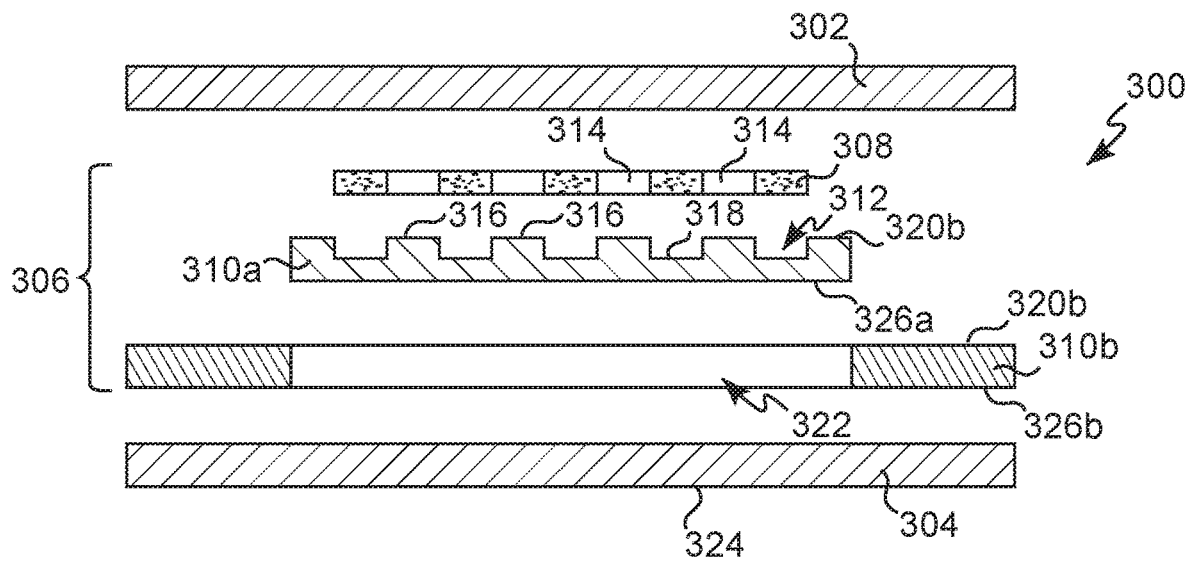
FIG. 14 is an exploded side cross-sectional view of a blank assembly for making cookware in accordance with some embodiments or aspects of the present disclosure.
Figure 15:
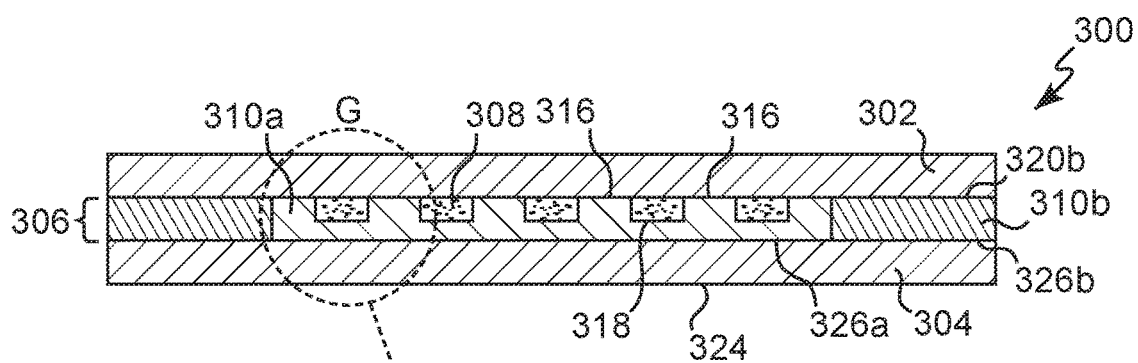
FIG. 15 is an assembled side cross-sectional view of the blank assembly of FIG. 14.
Figure 16:
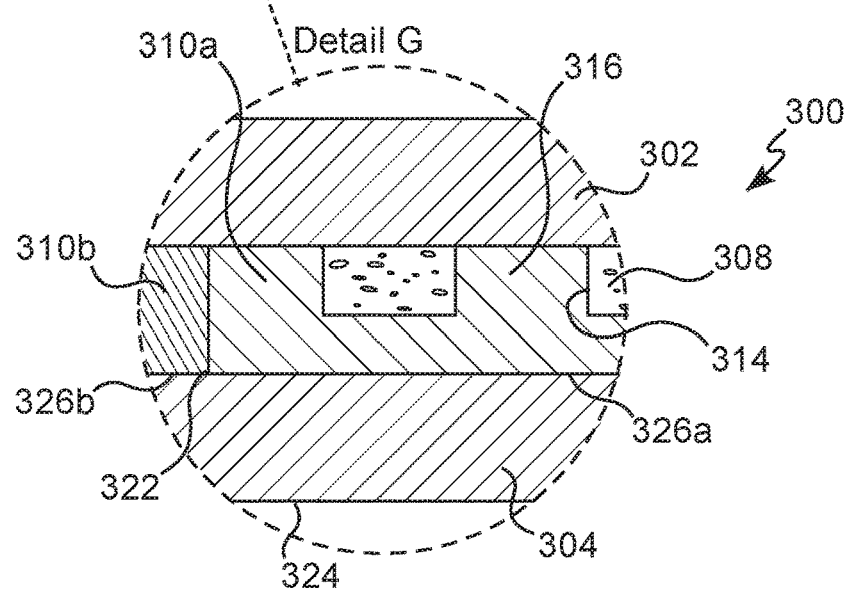
FIG. 16 is an enlarged view of Detail G shown in FIG. 15.

With reference to FIGS. 14-16, a blank assembly 300 is shown in accordance with another embodiment or aspect of the present disclosure. The components of the blank assembly 300 shown in FIGS. 14-16 are substantially similar to the components of the blank assembly 100 described herein with reference to FIGS. 1-3. Reference numerals in FIGS. 14-16 are used to illustrate identical components of the corresponding reference numerals in FIGS. 1-3, with the exception that the first digit of each reference number is replaced with a number 3. For example, whereas the first metal layer shown in FIGS. 1-3 is identified by a reference number 102, the same first metal layer shown in FIGS. 14-16 is identified by reference number 302. As the previous discussion regarding the components of the blank assembly 100 generally shown in FIGS. 1-3 is applicable to the blank assembly 300 shown in FIGS. 14-16, only the relative differences between the two blank assemblies are discussed hereinafter. Bonded multi-layer blank assembly 300 is shown on FIGS. 15-16.

With reference to FIGS. 14-16, the blank assembly 300 has at least one upper (first) metal disc or layer 302 (hereinafter referred to as "first metal layer 302") and at least one lower (third) metal disc or layer 304 (hereinafter referred to as "third metal layer 304"). A second disc or layer 306 (hereinafter referred to as "second layer 306") is disposed between the first metal layer 302 and the third metal layer 304. An upper or top surface of the first metal layer 302 forms an inner surface of the cookware while a lower or bottom surface of the third metal layer 304 forms an outer surface of the cookware.

The first metal layer 302 may be formed from a food-grade stainless steel, such as a 400 or 436 series stainless steel, or from a titanium alloy suitable for use as a food preparation surface. The material of the third metal layer 304 is selected such that it has a bonding affinity to the metal material of at least a portion of the second layer 306, as discussed herein. In some embodiments or aspects, the third metal layer 304 may be made from a food-grade stainless steel, such as a 400 or 436 series stainless steel, or from a titanium alloy. The material of the third metal layer 304 may be aluminum. In some embodiments or aspects, the material of the third metal layer 304 may be, for example, a high purity aluminum, or an alloyed aluminum material clad with thin pure layers of aluminum on either side to accommodate metallurgical bonding. In some embodiments or aspects, the material of the third metal layer 304 may be a 1000 series aluminum alloy, such as an 1100 aluminum alloy. A bottom surface 324 of the third metal layer 304 may be substantially planar and without any protrusions or recesses.

With continued reference to FIGS. 14-16, the second layer 306 is disposed between the first metal layer 302 and the third metal layer 304. Whereas the second layer 106 in FIGS. 1-3 has a second metal layer 110 and a perforated graphite layer 108 received within a cavity 112 of the second metal layer 110, the second layer 306 in FIGS. 14-16 comprises a second metal layer 310 and a perforated graphite disc or layer 308 (hereinafter referred to as "perforated graphite layer 308"). The second metal layer 310 has a central metal core disc or layer 310a (hereinafter referred to as "central metal layer 310a"), a ring-shaped outer core metal disc or layer 310b (hereinafter referred to as "outer metal layer 310b") surrounding the central metal layer 310a. Perforated graphite layer 308 is received within a cavity 312 of the second metal layer 310. Cavity 312 is formed on the central metal layer 310a. The material of the outer metal layer 310a and/or the central metal layer 310b may be aluminum. In some embodiments or aspects, the material of the outer metal layer 310a and/or the central metal layer 310b may be, for example, a high purity aluminum, or an alloyed aluminum material clad with thin pure layers of aluminum on either side to accommodate metallurgical bonding. In some embodiments or aspects, the material of the outer metal layer 310a and/or the central metal layer 310b may be a 1000 series aluminum alloy, such as an 1100 aluminum alloy. Thus, the material of the second metal layer 310 may be aluminum.

The outer metal layer 310b has a central opening 322 shaped to receive the central metal layer 310a therein. In some embodiments or aspects, the central opening 322 may have a circular shape with a diameter that is the same or slightly larger than a diameter of a circularly-shaped central metal layer 310a. For example, the central opening 322 may have a diameter of about 3 inches (76.2 mm) to about 12 inches (305 mm), such as about 7 inches (178 mm). A thickness of the central metal layer 310a may the same or different than the thickness of the outer metal layer 310b. For example, the central metal layer 310a may be thinner or thicker than the outer metal layer 310b. In some embodiments or aspects, the central metal layer 310a is thicker (such as by 0.004 in (0.1 mm)) than the outer metal layer 310b. In this manner, the additional material of the central metal layer 310a may be compressed during solid state bonding such that the upper and lower surfaces of the central metal layer 310a and the outer metal layer 310b are substantially planar. The compression of the additional material of the central metal layer 310a contributes to a stronger bond with the perforated graphite layer 308 during solid state bonding. Bottom surfaces 326a, 326b of the central metal layer 310a and the outer metal layer 310b may be substantially planar and without any protrusions or recesses.

With continued reference to FIGS. 14-16, the cavity 312 may have a circular shape having a diameter that is the same or slightly larger than a diameter of a circularly-shaped perforated graphite layer 308. In other embodiments or aspects, the cavity 312 may have any desired geometric shape that corresponds to any desired geometric shape of the perforated graphite layer 308. In some embodiments or aspects, the cavity 312 may be centered on the central metal layer 310a such that the cavity 312 and the central metal layer 310a share a common axis.

With continued reference to FIGS. 14-16, a plurality of spaced-apart posts 316 (hereinafter referred to as "posts 316") protrude upwardly from a bottom surface 318 of the cavity 312. Similar to the posts 116 shown in FIG. 4, the posts 316 may be arranged in an ordered array or distributed randomly within the cavity 312. The posts 316 may have a circular cross-sectional shape, a polygonal shape (such as a hexagonal shape), or any other geometric shape.

In some embodiments or aspects, perforated graphite layer 308 has a plurality of spaced-apart holes 314 formed therethrough. Each of the holes 314 extends through the material of the perforated graphite layer 308 between its upper surface and its lower surface. The size and arrangement of the holes 314 in the perforated graphite layer 308 is selected to correspond to the size and arrangement of the posts 316 on the central metal layer 310a. In this manner, the posts 316 can be arranged such that all of the posts 316 are registered (i.e., in alignment) with all of the holes 314, with each post 316 being received within the respective hole 314. In some embodiments or aspects, a plurality of posts 316 may be received within a single hole 314. In further embodiments or aspects, the number of holes 314 may be larger than the number of posts 316, such that some holes 314 do not have posts 316 therein. The holes 314 may have the same or different shape as the posts 316.

The perforated graphite layer 308 may be made of anisotropic graphite that is configured to transmit thermal energy primarily in a radial (rather than axial) direction. In this manner, the cooking surface can be heated uniformly, while avoiding hot spots. As described herein, the perforated graphite layer 308 may have a minimum thickness of about 0.010 inches (0.25 mm). Without intending to be bound by theory, it has been found that the perforated graphite layer 308 with a thickness below the minimum thickness may be damaged during the solid state bonding process, thereby compromising its ability to evenly distribute heat along the cooking surface of the cookware. Furthermore, the perforated graphite layer 308 having the at least minimum thickness is easier to handle and cheaper to manufacture than perforated graphite layers with a smaller thickness, thereby reducing the overall cost of the cookware. In addition, the perforated graphite layer 308 having the minimum thickness is configured to move more energy in the plane defining the cooking surface than perforated graphite layer having a smaller thickness. In some embodiments or aspects, the thickness of the perforated graphite layer 308 is selected to be smaller than a height of the posts 316 of the central metal layer 310a. In this manner, upper surface of the perforated graphite layer 308 may be recessed within the cavity 312 relative to the upper surface 320 of the central metal layer 310a and the peaks of the posts 316. In other embodiments or aspects, the thickness of the perforated graphite layer 308 is selected to be the same as the height of the posts 316/depth of the cavity 312. In further embodiments or aspects, the thickness of the perforated graphite layer 308 may be selected to be slightly larger than a height of the posts 316/depth of the cavity 312 of the second metal layer 310. In this manner, upper surface of the perforated graphite layer 308 may protrude slightly from the cavity 312 relative to the upper surface 320 of the second metal layer 310 and the peaks of the posts 316. Due to the perforated graphite layer 308 being more compressible than the first and second metal layers 302, 310, the perforated graphite layer 308 is compressed into the cavity 312 during the solid state bonding process.

Having described the structure of the blank assembly 100, 200, 300 in accordance with various embodiments or aspects of the present disclosure, a method of making cookware using the bonded multi-layer blank assembly 100, 200, 300 will now be described. Prior to bonding, the layers of the blank assembly 100, 200, 300 undergo appropriate surface preparation steps, such as degreasing, surface abrasion by chemical or mechanical methods, and the like. After appropriate surface preparation, an unbonded blank assembly 100, 200, 300 is formed by stacking the various layers on top of each other. Desirably, the layers are aligned such that centers of each layer share a common axis. In some embodiments or aspects, the layers may be stacked such that their centers are offset from one another. For efficiency of manufacture, a plurality of unbonded blank assemblies 100, 200, 300 may be stacked on top of each other, with or without spacer layers between adjacent blank assemblies 100, 200, 300.

In the case of the blank assembly 100 shown in FIGS. 1-3, the second layer 106 is stacked on the upper surface of the third metal layer 104. The perforated graphite layer 108 of the second layer 106 is arranged within the cavity 112 of the second metal layer 110 such that the holes 114 in the perforated graphite layer 108 are aligned with the posts 116 in the cavity 112. Peaks of the posts 116 are configured to be at a same height or extend above an upper surface of the perforated graphite layer 108 when the posts 116 are received within the holes 114 of the perforated graphite layer 108. The first metal layer 102 is stacked on top of the second layer 106 such that a lower surface of the first metal layer 102 is positioned opposite an upper surface of the second metal layer 110 and the perforated graphite layer 108. When stacked, the first metal layer 102, the second layer 106, and the third metal layer 104 are substantially parallel to each other. For efficiency of manufacture, a plurality of unbonded blank assemblies 100 may be stacked on top of each other, with or without spacer layers between adjacent blank assemblies 100.

In the case of the blank assembly 200 shown in FIGS. 8-10, the core layer 206 (i.e., the perforated graphite layer 208) is arranged within the cavity 212 of the second metal layer 210 such that the holes 214 in the perforated graphite layer 208 are aligned with the posts 216 in the cavity 212. Peaks of the posts 216 are configured to be at a same height or extend above an upper surface of the perforated graphite layer 208 when the posts 216 are received within the holes 214 of the perforated graphite layer 208. The first metal layer 202 is stacked on top of the core layer 206 and the second metal layer 210 such that a lower surface of the first metal layer 202 is positioned opposite an upper surface 220 of the second metal layer 210 and the perforated graphite layer 208. When stacked, the upper metal layer 22, the perforated graphite layer 208, and the second metal layer 210 are substantially parallel to each other.

In the case of the blank assembly 300 shown in FIGS. 14-16, the central metal layer 310a and the outer metal layer 310b are positioned on the upper surface of the third metal layer 304 such that the central metal layer 310a is received within the central opening 322 of the outer metal layer 310b. The perforated graphite layer 308 is arranged within the cavity 312 of the central metal layer 310a such that the holes 314 in the perforated graphite layer 308 are aligned with the posts 316 in the cavity 312. Peaks of the posts 316 are configured to be at a same height or extend above an upper surface of the perforated graphite layer 308 when the posts 316 are received within the holes 314 of the graphite layer 308. The first metal layer 302 is stacked on top of the second layer 306 (i.e., the central metal layer 310a, the outer metal layer 310b, and the perforated graphite layer 308) such that a lower surface of the first metal layer 302 is positioned opposite an upper surface of the central metal layer 310a, the outer metal layer 310b, and the perforated graphite layer 108. When stacked, the first metal layer 302, the second layer 306, and the third metal layer 304 are substantially parallel to each other.

The blank assembly 100, 200, 300 or a plurality of stacked blank assemblies 100, 200, 300 are then placed in a press apparatus (not shown) for application of a load or pressure in the normal or perpendicular direction relative to the planes of the layers in the blank assemblies 100, 200, 300 via a solid state bonding technique. The solid state bonding technique of bonding pre-cut near net shape plate blanks not only reduces scrap losses heretofore encountered in the conventional roll bonding manufacture of composite cookware but also permits the use of other materials in making multiple composites which have proven difficult, impossible and/or expensive to roll-bond. For example, solid state bonding permits the use of different grades of stainless steel than otherwise possible in conventional roll bonding so as to lower costs of materials. Furthermore, solid state bonding further allows encapsulating of materials, such as graphite, that cannot otherwise be bonded to stainless steel.

While under a pressure of between 5,000 and 20,000 psi (34.5-137.9 MPa), heat is applied to the blank assembly or assemblies 100, 200, 300 between about 500° F. and 1,000° F. (260-538° C.) for a sufficient time (about 1-4 hours) to achieve solid state bonding (i.e., metallurgical bonding) between the metal layers in the blank assembly or assemblies 100, 200, 300. During the solid state bonding process, air that may be present between the posts of the core metal layer and the perforated graphite layer due to dimensional differences between the core metal layer and the perforated graphite layer is pressed out from the blank assembly 100, 200, 300.

In the case of the blank assembly 100 shown in FIGS. 1-3, during the solid state bonding process, the lower surface of the second metal layer 110 is metallurgically bonded with the upper surface of the third metal layer 104. The upper surface of the second metal layer 110 and the posts 116 are metallurgically bonded with the lower surface of the first metal layer 102. The perforated graphite layer 108 is completely encapsulated between the second metal layer 110 and the first metal layer 102, with the cavity 112 of the second metal layer 110 completely surrounding the perforated graphite layer 108 on its lower and lateral sides and the first metal layer 102 enclosing its upper side.

Each blank assembly 100, 200, 300 is then removed from the press apparatus and allowed to cool. In some embodiments or aspects, cooling may be accomplished by exposure to ambient air or by using a cooling agent, such as forced air or liquid.

After solid state bonding, the bonded blank assembly 100, 200, 300 is formed in a drawing press, a spin form, or a hydroform machine (not shown) into a desired shape of cookware 400, such as a fry pan shape depicted in FIGS. 5-7, 11-13, and 17-19. While the bonded blank assemblies 100, 200, 300 may be oriented such that the first metal layers 102, 202, 302 form the inner surface of the cookware 400 and the second metal layer 210 or the third metal layers 104, 304 form the outer surface of the cookware 400, the bonded blank assemblies 100, 200, 300 can be flipped 180° such that the first metal layers 102, 202, 302 form the outer surface of the cookware 400 and the second metal layer 210 or the third metal layers 104, 304 form the inner surface of the cookware 400. The cookware 400 has a substantially planar cooking surface 402 and a raised sidewall 404 surrounding the cooking surface 402 and protruding vertically above the cooking surface 402. The sidewall 404 has a radiused portion 406 connected to the cooking surface 402 and a rim 408 at a free end thereof. A handle or handles (not shown) may be attached to the cookware in a known manner. In further embodiments or aspects, a non-stick coating may be applied to the cooking surface 402 of the cookware 400. The cookware 400 formed using the blank assembly 100, 200, 300 described herein has reduced weight, such as around 30% less weight, compared to conventional cookware due to the use of lightweight graphite and aluminum materials. Furthermore, the cookware 400 has increased performance compared to conventional cookware due to increased speed to heat and an even heat distribution across the cooking surface facilitated by the perforated graphite layer.

In various examples, the present disclosure may be further characterized by one or more of the following clauses:

Clause 1. Cookware 400 made from a bonded multi-layer blank assembly 100; 200; 300, the cookware 400 comprising: a first metal layer 102; 202; 302; a second metal layer 110; 210; 310 having a cavity 112; 212; 312 with a plurality of spaced-apart posts 116; 216; 316 protruding from a bottom surface 118; 218; 318 of the cavity 112; 212; 312; and a perforated graphite layer 108; 208; 308 having a thickness of at least 0.010 in. (0.254 mm) and a plurality of spaced-apart holes 114; 214; 314 formed therethrough, wherein the perforated graphite layer 108; 208; 308 is positioned within the cavity 112; 212; 312 of the second metal layer such that the plurality of spaced-apart posts 116; 216; 316 extend through the plurality of spaced-apart holes 114; 214; 314, and wherein the second metal layer 110; 210; 310 is metallurgically bonded to the first metal layer 102; 202; 302 at least via the plurality of spaced-apart posts 116; 216; 316.

Clause 2. The cookware 400 of clause 1, wherein a surface of the second metal layer 110; 210; 310 surrounding the cavity 112; 212; 312 is metallurgically bonded to the first metal layer 102; 202; 302, said surface being preferably planar.

Clause 3. The cookware 400 of clause 1 or 2, wherein a depth of the cavity 112; 212; 312 is the same or larger than the thickness of the perforated graphite layer 108; 208; 308.

Clause 4. The cookware 400 of any of clauses 1-3, wherein the plurality of spaced-apart posts 116; 216; 316 have a circular cross-section or a polygonal cross-section.

Clause 5. The cookware 400 of any of clauses 1-4, wherein the perforated graphite layer 108; 208; 308 is made from anisotropic graphite.

Clause 6. The cookware 400 of any of clauses 1-5, wherein the perforated graphite layer 108; 208; 308 has a thickness between 0.010 in. (0.25 mm) to 0.100 (2.5 mm) in Clause 7. The cookware 400 of any of clauses 1-6, wherein the first metal layer 102; 202; 302 is made of aluminum.

Clause 8. The cookware 400 of clause 7, wherein the aluminum is an 1100 alloy.

Clause 9. The cookware 400 of any of clauses 1-6, wherein the first metal layer 102; 202; 302 is made of stainless steel.

Clause 10. The cookware 400 of any of clauses 1-6, wherein the first metal layer 102; 202; 302 is made of titanium.

Clause 11. The cookware 400 of any of clauses 1-10, wherein the second metal layer 110; 210; 310 is made of aluminum.

Clause 12. The cookware 400 of any of clauses 1-11, further comprising a third metal layer 104; 304 metallurgically bonded to a planar side of the second metal layer 110; 310 opposite the cavity 112; 312.

Clause 13. The cookware 400 of clause 12, wherein the third metal layer 104; 304 is made of aluminum.

Clause 14. The cookware 400 of clause 13, wherein the aluminum is an 1100 alloy.

Clause 15. The cookware 400 of clause 12, wherein the third metal layer 104; 304 is made of stainless steel.

Clause 16. The cookware 400 of clause 15, wherein the stainless steel is a ferro-magnetic grade of stainless steel.

Clause 17. The cookware 400 of clause 12, wherein the third metal layer 104; 304 is made of titanium.

Clause 18. The cookware 400 of any of clauses 9-17, wherein the second metal layer 310 comprises an outer metal layer 310a and a central metal layer 310b received within a central opening 322 of the outer metal layer 310a, and wherein the cavity 312 is provided on the central metal layer 310b.

Clause 19. The cookware 400 of clause 18, wherein the outer metal layer 310a is thinner than the central metal layer 310b.

Clause 20. The cookware 400 of any of clauses 1-19, wherein the first metal layer 102 comprises a first sub-layer 102a made of aluminum and a second sub-layer 102b made of stainless steel, first sub-layer 102a being metallurgically bonded to the spaced-apart posts 116.

Clause 21. The cookware of claim 20, wherein the second metal layer 110 is metallurgically bonded to the first sub-layer 102a of the first metal layer 102.

Clause 22. The cookware 400 of clause 20, wherein a surface of the second metal layer 110 surrounding the cavity 112 is metallurgically bonded to the first sub-layer 102a of the first metal layer 102, said surface being preferably planar.

Clause 23. The cookware 400 of any of clauses 1-22, wherein the second metal layer 112; 212; 312 is metallurgically bonded to a planar lower surface of the first metal layer 102; 202; 302.

Clause 24. The cookware 400 of any of clauses 1-23, wherein a bottom surface of the second metal layer 110; 210; 310 is planar.

Clause 25. A method of making cookware 400, the method comprising: (a) providing a first metal layer 102; 202; 302; (b) providing a perforated graphite layer 108; 208; 308 having a thickness of at least 0.010 in. (0.254 mm) and a plurality of spaced-apart holes 114; 214; 314 formed therethrough, (c) providing a second metal layer 110; 210; 310 having a cavity 112; 212; 312 with a plurality of spaced-apart posts protruding from a bottom surface 118; 218; 318 of the cavity 112; 212; 312; (d) stacking the layers provided in (a)-(c) in a blank assembly 100; 200; 300 such that the perforated graphite layer 108; 208; 308 is received within the cavity 112; 212; 312 of the second metal layer 110; 210; 310 whereby the plurality of spaced-apart posts 116; 216; 316 of the second metal layer 110; 210; 310 are aligned with and pass through the plurality of spaced-apart holes 114; 214; 314 in the perforated graphite layer 108; 208; 308 such that a lower surface of the first metal layer 102; 202; 302 contacts at least an upper surface of upper end portions of the plurality of spaced-apart posts 116; 216; 316; and (e) pressing the blank assembly 100; 200; 300 by applying a force in a direction perpendicular to a plane of the layers in the blank assembly 100; 200; 300 and concurrently heating the blank assembly 100; 200; 300 to achieve a metallurgical bond between the first metal layer 102; 202; 302 and the second metal layer 110; 210; 310 at least via the plurality of spaced-apart posts 116; 216; 316 to provide a bonded multi-layer blank assembly 100; 200; 300.

Clause 26. The method of clause 25, further comprising: (f) cooling the bonded multi-layer blank assembly 100; 200; 300; and (g) forming the bonded multi-layer blank 100; 200; 300 assembly into the cookware 400.

Clause 27. The method of clause 25 or 26, wherein the first metal layer 102; 202; 302 is made of aluminum or stainless steel or titanium, and wherein the second metal layer 110; 210; 310 is made of aluminum.

Clause 28. The method of any of clauses 25-27, further comprising: (h) providing a third metal layer 104; 304 and stacking the third metal layer 104; 304 with the other layers of the blank assembly 100; 300 prior to pressing the blank assembly 100; 300 such that the third metal layer 104; 304 faces a planar side of the second metal layer 110; 310 opposite the cavity 114; 314.

Clause 29. The method of clause 28, further comprising: (i) providing a fourth metal layer and stacking the fourth metal layer on top of the first metal layer of the blank assembly prior to pressing the blank assembly.

Clause 30. The method of clause 29, wherein the third metal layer and the fourth metal layer are made of stainless steel.

Clause 31. Cookware made from a bonded multi-layer blank assembly, the cookware comprising: a first metal layer; a lower metal layer; and a core disposed between the first metal layer and the lower metal layer, the core comprising: a core metal layer made of aluminum and having a cavity with a plurality of spaced-apart posts protruding from a bottom surface of the cavity; and a perforated graphite layer having a plurality of spaced-apart holes formed therethrough, wherein the graphite layer is positioned in the cavity of the core metal layer such that the plurality of posts extend through the plurality of holes, and wherein the core metal layer is metallurgically bonded to the first metal layer at least via the plurality of posts and to the second metal layer via a bottom surface of the core metal layer.

Clause 32. The cookware of clause 31, wherein an upper surface of the core metal layer surrounding the cavity is metallurgically bonded to the first metal layer.

Clause 33. The cookware of clause 31 or 32, wherein a depth of the cavity is smaller, the same, or larger than a thickness of the graphite layer.

Clause 34. The cookware of any of clauses 31-33, wherein the core metal layer is metallurgically bonded to a planar lower surface of the first metal layer.

Clause 35. The cookware of any of clauses 31-34, wherein the plurality of posts have a circular cross-section.

Clause 36. The cookware of any of clauses 31-35, wherein the plurality of posts have a polygonal cross-section.

Clause 37. The cookware of any of clauses 31-36, wherein a bottom surface of the core metal layer is planar.

Clause 38. The cookware of any of clauses 31-37, wherein the core metal layer comprises an outer core metal layer and a central core metal layer received within a central opening of the outer core metal layer.

Clause 39. The cookware of clause 38, wherein the outer core metal layer has a same thickness as the central core metal layer.

Clause 40. The cookware of clause 39, wherein the outer core metal layer has a smaller thickness than the central core metal layer.

Clause 41. The cookware of any of clauses 31-40, wherein the first metal layer is made of stainless steel or titanium.

Clause 42. The cookware of clause 41, wherein the stainless steel is a ferro-magnetic grade of stainless steel.

Clause 43. The cookware of any of clauses 31-42, wherein the lower metal layer is made of stainless steel or titanium.

Clause 44. The cookware of clause 43, wherein the stainless steel is a ferro-magnetic grade of stainless steel.

Clause 45. The cookware of any of clauses 31-44, wherein the core metal layer is made of aluminum.

Clause 46. The cookware of clause 45, wherein the aluminum is an 1100 alloy.

Clause 47. The cookware of any of clauses 31-46, wherein the graphite layer is made from anisotropic graphite.

Clause 48. The cookware of any of clauses 31-47, wherein the first metal layer comprises a first sub-layer made of aluminum and a second sub-layer made of stainless steel.

Clause 49. The cookware of clause 48, wherein the core metal layer is metallurgically bonded to the first sub-layer of the first metal layer.

Clause 50. The cookware of any of clauses 31-51, wherein the graphite layer has a thickness between 0.010 in. (0.25 mm) to 0.100 in. (2.5 mm).

Clause 51. A method of making cookware, the method comprising: (a) providing an upper metal disc of stainless steel; (b) providing a perforated graphite disc having a plurality of spaced-apart holes formed therethrough, (c) providing a core metal disc of aluminum having a cavity with a plurality of spaced-apart posts protruding from a bottom surface of the cavity; (d) providing a lower metal disc of stainless steel; (e) stacking the discs provided in (a)-(d) in a blank assembly such that the graphite disc is received within the cavity of the core metal disc whereby the plurality of posts in the core metal disc are aligned with and pass through the plurality of holes in the graphite disc, with the plurality of posts having upper end portions extending above an upper surface of the graphite disc such that a lower surface of the upper metal disc contacts an upper surface of an outer portion of the core metal disc and the upper end portions of the plurality of posts; and (f) pressing the blank assembly by applying a force in a direction perpendicular to a plane of the discs in the blank assembly and concurrently heating the blank assembly to achieve a metallurgical bond between metal materials of the discs in the blank assembly to provide a bonded blank assembly.

Clause 52. The method of clause 51, further comprising: (g) cooling the bonded blank assembly; and (h) forming the bonded blank assembly into the cookware.

Clause 53. Cookware made from a bonded multi-layer blank assembly, the cookware comprising: a first metal layer; a lower metal layer having a cavity with a plurality of spaced-apart posts protruding from a bottom surface of the cavity; and a perforated graphite layer having a plurality of spaced-apart holes formed therethrough, wherein the graphite layer is positioned within the cavity of the core metal layer such that the plurality of posts extend through the plurality of holes, and wherein the lower metal layer is metallurgically bonded to the first metal layer at least via the plurality of posts.

Clause 54. The cookware of clause 53, wherein an upper surface of the lower metal layer surrounding the cavity is metallurgically bonded to the first metal layer.

Clause 55. The cookware of clause 53 or 54, wherein a depth of the cavity is smaller, the same, or larger than a thickness of the graphite layer.

Clause 56. The cookware of any of clauses 53-55, wherein the second metal layer is metallurgically bonded to a planar lower surface of the first metal layer.

Clause 57. The cookware of any of clauses 53-56, wherein the plurality of posts have a circular cross-section.

Clause 58. The cookware of any of clauses 53-57, wherein the plurality of posts have a polygonal cross-section.

Clause 59. The cookware of any of clauses 53-58, wherein a bottom surface of the core metal layer is planar.

Clause 60. The cookware of any of clauses 53-59, wherein the first metal layer is made of stainless steel or titanium.

Clause 61. The cookware of clause 60, wherein the stainless steel is a ferro-magnetic grade of stainless steel.

Clause 62. The cookware of any of clauses 51-61, wherein the lower metal layer is made of aluminum.

Clause 63. The cookware of clause 62, wherein the aluminum is an 1100 alloy.

Clause 64. The cookware of any of clauses 53-63, wherein the graphite layer is made from anisotropic graphite.

Clause 65. A method of making cookware, the method comprising: (a) providing an upper metal disc of stainless steel; (b) providing a perforated graphite disc having a plurality of spaced-apart holes formed therethrough, (c) providing a lower metal disc of aluminum having a cavity with a plurality of spaced-apart posts protruding from a bottom surface of the cavity; (d) stacking the discs provided in (a)-(c) in a blank assembly such that the graphite disc is received within the cavity of the lower metal disc whereby the plurality of posts in the lower metal disc are aligned with and pass through the plurality of holes in the graphite disc, with the plurality of posts having upper end portions extending above an upper surface of the graphite disc such that a lower surface of the upper metal disc contacts an upper surface of an outer portion of the lower metal disc and the upper end portions of the plurality of posts; and (e) pressing the blank assembly by applying a force in a direction perpendicular to a plane of the discs in the blank assembly and concurrently heating the blank assembly to achieve a metallurgical bond between metal materials of the discs in the blank assembly to provide a bonded blank assembly.

Clause 66. The method of clause 65, further comprising: (f) cooling the bonded blank assembly; and (g) forming the bonded blank assembly into the cookware.

The present disclosure has been described with reference to specific details of particular examples thereof. It is not intended that such details be regarded as limitations upon the scope of the disclosure except insofar as and to the extent that they are included in the accompanying claims.

We claim:

1. Cookware made from a bonded multi-layer blank assembly, the cookware comprising:
   a first metal layer;
   a second metal layer having a cavity with a plurality of spaced-apart posts protruding from a bottom surface of the cavity, the second metal layer made of aluminum;
   a perforated graphite layer having a thickness of at least 0.010 in. (0.254 mm) and a plurality of spaced-apart holes formed therethrough; and
   a third metal layer,
   wherein the perforated graphite layer is positioned within the cavity of the second metal layer such that the plurality of spaced-apart posts extend through the plurality of spaced-apart holes,
   wherein the second metal layer is metallurgically bonded to the first metal layer at least via the plurality of spaced-apart posts, and
   wherein the third metal layer is metallurgically bonded to a planar side of the second metal layer opposite the cavity.

2. The cookware of claim 1, wherein a surface of the second metal layer surrounding the cavity is metallurgically bonded to the first metal layer.

3. The cookware of claim 1, wherein a depth of the cavity is smaller, the same, or larger than the thickness of the perforated graphite layer.

4. The cookware of claim 1, wherein the plurality of spaced-apart posts have a circular cross-section or polygonal cross-section.

5. The cookware of claim 1, wherein the perforated graphite layer is made from anisotropic graphite.

6. The cookware of claim 1, wherein the third metal layer is made of stainless steel.

7. The cookware of claim 1, wherein the second metal layer comprises an outer metal layer and a central metal layer received within a central opening of the outer metal layer, and wherein the cavity is provided on the central metal layer.

8. The cookware of claim 7, wherein the outer metal layer is thinner than the central metal layer.

9. The cookware of claim 1, wherein the first metal layer comprises a first sub-layer made of aluminum and a second sub-layer made of stainless steel.

10. The cookware of claim 9, wherein the second metal layer is metallurgically bonded to the first sub-layer of the first metal layer.

11. The cookware of claim 1, wherein the first metal layer is made of aluminum that is an 1100 alloy.

12. The cookware of claim 1, wherein the second metal layer is made of aluminum that is alloyed aluminum material clad with thin pure layers of aluminum on either side to accommodate metallurgical bonding.

13. A method of making cookware, the method comprising:

(a) providing a first metal layer;
(b) providing a perforated graphite layer having a thickness of at least 0.010 in. (0.254 mm) and a plurality of spaced-apart holes formed therethrough,
(c) providing a second metal layer having a cavity with a plurality of spaced-apart posts protruding from a bottom surface of the cavity, the second metal layer made of aluminum;
(d) providing a third metal layer;
(e) stacking the layers provided in (a)-(d) in a blank assembly such that the perforated graphite layer is received within the cavity of the second metal layer whereby the plurality of posts of the second metal layer are aligned with and pass through the plurality of holes in the perforated graphite layer such that a lower surface of the first metal layer contacts at least an upper surface of upper end portions of the plurality of posts, and such that the third layer is positioned opposite a planar side of the second metal layer opposite the cavity; and
(f) pressing the blank assembly by applying a force in a direction perpendicular to a plane of the layers in the blank assembly and concurrently heating the blank assembly to achieve a metallurgical bond between the first metal layer and the second metal layer and between the second metal layer and the third metal layer to provide a bonded blank assembly.

14. The method of claim 13, further comprising:
(g) cooling the bonded blank assembly; and
(h) forming the bonded blank assembly into the cookware.

15. The method of claim 13, further comprising:
(i) providing a fourth metal layer and stacking the fourth metal layer on top of the first metal layer of the blank assembly prior to pressing the blank assembly.

16. The method of claim 15, wherein the third metal layer and the fourth metal layer are made of stainless steel.

* * * * *